United States Patent
Bosch et al.

(10) Patent No.: US 9,253,255 B1
(45) Date of Patent: *Feb. 2, 2016

(54) CONTENT DELIVERY NETWORK REFERRAL

(71) Applicant: Juniper Networks, Inc., Sunnyvale, CA (US)

(72) Inventors: Hendrikus G. P. Bosch, Aalsmeer (NL); Scott Ferguson, Allen, TX (US); Jan Medved, Pleasanton, CA (US); David Ward, Los Gatos, CA (US); Hannes Gredler, Pillberg (AT)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/562,052

(22) Filed: Dec. 5, 2014

Related U.S. Application Data

(63) Continuation of application No. 13/547,917, filed on Jul. 12, 2012, now Pat. No. 8,909,736.

(51) Int. Cl.
*G06F 15/16* (2006.01)
*H04L 29/08* (2006.01)

(52) U.S. Cl.
CPC ................................ *H04L 67/1093* (2013.01)

(58) Field of Classification Search
CPC ............. H04L 29/08072; H04L 29/06; H04L 29/0809; H04L 29/08981; G06Q 30/02
USPC .......................................................... 709/217
See application file for complete search history.

(56) References Cited

U.S. PATENT DOCUMENTS

| | | | |
|---|---|---|---|
| 5,519,704 A | 5/1996 | Farinacci et al. | |
| 7,499,459 B1 * | 3/2009 | Scudder | H04L 45/02 370/389 |
| 7,710,899 B1 * | 5/2010 | Ward | H04L 45/02 370/254 |
| 8,255,382 B2 | 8/2012 | Carpenter et al. | |
| 8,606,847 B2 | 12/2013 | Raghunath et al. | |

(Continued)

FOREIGN PATENT DOCUMENTS

WO  WO 2006071901 A2 *  7/2006  ............. H04L 45/02

OTHER PUBLICATIONS

Alimi et al., "ALTO Protocol: draft-ietf-alto-protocol-06.txt" ALTO Working Group, the Internet Engineering Task Force draft, Oct. 25, 2010, 65 pp.

(Continued)

*Primary Examiner* — Kostas Katsikis
(74) *Attorney, Agent, or Firm* — Shumaker & Sieffert, P.A.

(57) ABSTRACT

In general, techniques are described for managing content request referrals by keying content requests to a composite key data structure that maps end-user address prefixes and content identifiers to content delivery network servers of downstream CDNs. In one example, a CDN exchange includes a communication module to receive first network prefixes and first content identifiers from a first secondary content delivery network and to receive second network prefixes and second content identifiers from a second secondary content delivery network. A request router of the CDN exchange redirects the content request to the first secondary content delivery network or to the second secondary content delivery network according to a network address of the end user device and a content identifier for the content request.

19 Claims, 9 Drawing Sheets

(56) References Cited

U.S. PATENT DOCUMENTS

| | | | |
|---|---|---|---|
| 8,688,775 | B2 | 4/2014 | Penno et al. |
| 8,700,801 | B2 | 4/2014 | Medved et al. |
| 8,909,736 | B1 | 12/2014 | Bosch et al. |
| 8,924,508 | B1 | 12/2014 | Medved et al. |
| 8,954,491 | B1 | 2/2015 | Medved et al. |
| 8,959,139 | B2 | 2/2015 | Medved et al. |
| 2002/0009079 | A1 | 1/2002 | Jungck et al. |
| 2003/0105865 | A1 | 6/2003 | McCanne et al. |
| 2003/0208472 | A1 | 11/2003 | Pham |
| 2004/0107177 | A1 | 6/2004 | Covill et al. |
| 2004/0196827 | A1 | 10/2004 | Xu et al. |
| 2004/0205235 | A1* | 10/2004 | Matsuhira ............ 709/238 |
| 2004/0260755 | A1 | 12/2004 | Bardzil et al. |
| 2005/0175341 | A1 | 8/2005 | Ovadia |
| 2006/0020684 | A1* | 1/2006 | Mukherjee et al. ........ 709/219 |
| 2007/0097991 | A1 | 5/2007 | Tatman |
| 2007/0286093 | A1 | 12/2007 | Cai et al. |
| 2008/0170578 | A1 | 7/2008 | Ould-Brahim |
| 2008/0222291 | A1 | 9/2008 | Weller et al. |
| 2008/0304482 | A1 | 12/2008 | Grassi et al. |
| 2009/0190518 | A1 | 7/2009 | Kim et al. |
| 2010/0114867 | A1 | 5/2010 | Olston |
| 2010/0125649 | A1 | 5/2010 | Day et al. |
| 2011/0231515 | A1 | 9/2011 | Day et al. |
| 2012/0144066 | A1 | 6/2012 | Medved et al. |
| 2012/0198022 | A1 | 8/2012 | Black et al. |
| 2012/0198361 | A1 | 8/2012 | Ganimasty et al. |
| 2012/0224506 | A1* | 9/2012 | Gredler et al. ............ 370/254 |
| 2013/0041972 | A1 | 2/2013 | Field et al. |

OTHER PUBLICATIONS

Bates et al., "Multiprotocol Extensions for BGP-4," Network Working Group, RFC 2858, Jun. 2000, 12 pp.

Bates et al., "Multiprotocol Extensions for BGP-4," Network Working Group, RFC 4760, Jan. 2007, 12 pp.

Berger et al., "The OSPF Opaque LSA Option," Network Working Group, RFC 5250, Jul. 2008, 17 pp.

Chandra et al., "BGP Communities Attribute," Network Working Group, RFC 1997, Aug. 1996, 5 pp.

Coppens, et al., "Design and Performance of a Self-Organizing Adaptive Content Distribution Network," Network Operations and Management Symposium, 2006. NOMS 2006. 1Oth IEEE/IFIP, Apr. 2006, 12 pp.

"Developing Innovative Embedded Applications in the Network with the Junos SDK," Juniper Networks, Inc., www.juniper.net, Nov. 2011, 16 pp.

Ginsberg et al., "Advertising Generic Information in IS-IS," draft-ielf-isis-genapp-04.1xt, Network Working Group, Nov. 10, 2010, 13 pp.

Gredler et al., "North-Bound Distribution of Link-State and TE Information using BGP," draft-gredler-idr-ls-distribution-01, Inter-Domain Routing, Mar. 12, 2012, 31 pp.

Moy, "OSPF Version 2," Network Working Group, RFC 2328, Apr. 1998, 204 pp.

"OSI IS-IS Intra-Domain Routing Protocol," ORAN ed., Network Working Group, RFC 1142, Feb. 1990, 157 pp.

Penno et al., "ALTO and Content Delivery Networks," Network Working Group, draft-penno-alto-cdn-03, Mar. 14, 2011, 28 pp.

Roh et al.,"Design of a Content Replacement Scheme using the p-based LRFU-K algorithm in Contents Delivery Networks," Advanced Communication Technology, 2008. ICACT 2008, 10th International Conference on, vol. 3, Feb. 2008, pp. 2067-2070.

Seedorf et al., "Application-Layer Traffic Optimization (ALTO) Problem Statement," Network Working Group, RFC 5693, Oct. 2009, 14 pp.

U.S. Appl. No. 13/547,978, by Bruno Rijsman, filed Jul. 12, 2012.

Prosecution History from U.S. Appl. No. 13/547,917, dated Dec. 23, 2013 through Aug. 15, 2014, 89 pp.

Prosecution History from U.S. Appl. No. 13/547,978, dated Oct. 31, 2014 through Feb. 2, 2015, 35 pp.

Notice of Allowance from U.S. Appl. No. 13/547,978, dated Mar. 11, 2015, 11 pp.

* cited by examiner

| PREFIX | URI | CACHE URI |
|---|---|---|
| P1 | WWW.DOMAIN.COM/* | WWW.CDN.SECONDARY-A.14.COM |
| P1 | WWW.DOMAIN.COM/VIDEO/* | WWW.CDN.SECONDARY-B.1.COM |
| P2 | WWW.DOMAIN.COM/* | WWW.CDN.SECONDARY-A.RR.COM |
| ••• | ••• | ••• |
| * | * | WWW.CDN.PRIMARY.ORIGIN.COM |

FIG. 4A

| PREFIX | URI | CACHE URI |
|---|---|---|
| P1, P2 | WWW.DOMAIN.COM/* | WWW.CDN.EXCHANGE.COM |
| ••• | ••• | ••• |
| * | * | WWW.CDN.PRIMARY.ORIGIN.COM |

FIG. 4B

CONTENT DELIVERY NETWORK REFERRAL

PRIORITY CLAIM

This application is a continuation of U.S. patent application Ser. No. 13/547,917, filed Jul. 12, 2012, the entire content of which is being incorporated herein by reference.

TECHNICAL FIELD

The invention relates to computer networks and more, specifically, to content delivery using computer networks.

BACKGROUND

Content providers increasingly rely on content delivery networks (CDNs) to distribute content requested by a geographically diverse clientele. Content delivery networks reduce delivery costs, improve performance and robustness, and enhance a quality of experience for end users by caching copies of content in numerous locations to reduce the distance between end users and a given copy of the content.

In general, a CDN includes a distribution system made up of content serving nodes, or "surrogates," that cache copies of content and deliver the content in response to requests from end user devices. The distribution system also distributes content within the CDN, with content typically originating at an origin server and being distributed among the surrogates that are closer, both topologically and geographically, to a service provider edge and therefore to the end users. A request router of the CDN functions as a request reference point for the CDN to end user devices. An end user device sends a content request (or "resource request") to the request router, which selects a capable surrogate to handle the content request and then redirects the end user device to the selected surrogate. The end user device reissues the content request directly to the selected surrogate, which delivers the requested content to the end user device.

A content service provider (CSP), like a CDN provider, provides to end users a content service that includes delivery of content, identified by a content identifier, to the end users in response to content requests. In some cases, a CSP or CDN provider may elect to delegate content request handling for a subset of end users to another CDN, thereby creating a hierarchical relationship between the CSP or CDN provider that is delegating content delivery (the "upstream entity") and the delegated, downstream CDN that then either selects a surrogate for content delivery or delegates content request handling for the subset of users to a still further downstream CDN.

In some instances, a CSP may be associated, through contractual or other arrangements, with a particular CDN that is responsible for delivering content in responsive to content requests directed to the content service of the CSP. This CDN, the "authoritative" or "primary" CDN of the CSP, may elect to delegate content request handling for subsets of end users to respective "secondary" CDNs. Secondary CDNs thus maintain a transitive relationship for delivery of CSP content via the primary CDN. When an end user device associated with a secondary CDN issues a content request to a CSP, the CSP redirects the content request to the primary CDN, which in turn refers the content request to the secondary CDN for still further redirection to a local media cache of the secondary CDN that stores a copy of the content.

SUMMARY

In general, techniques are described for managing content request referrals by keying content requests to a composite key space, or "tuple space," data structure that maps tuples of end-user address prefixes and content identifiers (e.g., Uniform Resource Identifiers (URIs)) to CDN servers of downstream CDNs or another referring entity. A referring entity may generate this data structure, referred to hereinafter as a "CDN-referral table," by receiving from secondary CDNs address prefixes in association with respective CDN servers of secondary CDNs (or by the respective secondary CDNs at large) and URIs for content served by the respective CDN servers. The address prefixes identify end user devices announced by respective secondary CDNs as reachable by the secondary CDNs. The referring entity consolidates the address prefixes and content URIs into composite keys that make up a "CDN-referral tuple space" and maps the composite keys to an appropriate CDN server. The referring entity that stores a CDN-referral table, such as a primary CDN, may subsequently receive a content request sourced by an end user device associated with a network address, key the combination of the URI of the content request and network address to the CDN-referral tuple space of the CDN-referral table, and redirect the content request to the mapped CDN server of a secondary CDN or another referring entity. Use of a CDN-referral table may enable reduction in the number of content request redirections by exposing content availability on individual media caches of secondary CDNs for owned prefixes and thus refining the granularity of the lookup data structure on which redirection is based.

The referring entity to which a primary CDN redirects a content request may include a CDN exchange that consolidates the upstream propagation of CDN-referral tuples from various secondary CDNs to one or more primary CDNs. In some instances, the CDN exchange operates as an intermediary between the secondary CDNs and primary CDNs by conducting CDN-referral tuples upstream. Secondary CDNs upload their CDN-referral tuples to a CDN exchange, which formulates respective CDN-referral tables for the secondary CDNs for forwarding to a primary CDN. In some instances, a trusted CDN exchange aggregates CDN-referral tables from multiple secondary CDNs, replaces the CDN-referral entity with its own CDN-referral servers, and publishes the aggregated CDN-referral table to the primary CDN. As a result, the primary CDN redirects content requests keyed to the aggregated CDN-referral table to the CDN exchange, which then uses the granular CDN-referral tuples for the multiple secondary CDNs to identify a satisfactory secondary CDN for further redirection and content request handling. The CDN exchange may therefore act as a trusted third-party intermediary between secondary CDNs and the primary CDN where, as in some cases, the various secondary CDNs prefer to obfuscate their customer prefix information or tertiary CDN server information (i.e., their "CDN footprint"). In addition, the aggregated CDN-referral table may reduce operational overhead for the primary CDN, for whenever the primary CDN receives a content request from a non-customer, the primary CDN may redirect the request to the CDN exchange rather than searching for a satisfactory secondary CDN. In some instances, a content service provider may contract directly with a CDN exchange to provide content request redirection to terminal CDNs capable of delivering the requested content.

The various CDNs and the CDN exchange may communicate according to a CDN Interconnection (CDNI) interface that defines a set of interfaces for CDN functionality and information exchange, including a control interface, logging interface, request routing interface, CDNI metadata interface, and so on. CDN applications executing on devices of CDNs described herein may implement the CDNI interface by dynamically extending a Multi-Protocol Border Gateway Protocol (MP-BGP) implementation using an Application Programming Interface (API) of a routing protocol process also executing on the devices. The API provides methods and parameters by which the CDN applications may (1) define a new code point (e.g., Address Family Identifier/Subsequent Address Family Identifier (AFI/SAFI)) for distributing CDNI-related information, (2) utilize a community (e.g., a BGP extended community) by the CDNI partners to define the appropriate distribution graph from one CDN to one or more other CDNs, and (3) inject/extract CDNI-related information with the newly-defined code point into/from the routing plane of a newly-defined or existing community. As a consequence, developers may rapidly develop new functionality independently of the network router vendor to extend operations of a CDN for CDNI information exchange, including CDN-referral tuple propagation. By utilizing an existing routing protocol having an exposed API to distribute CDNI-related information, the techniques may facilitate reliable, scalable, loop-free, and generalized data distribution according to a specified distribution graph defined by client routers that advertise the community spaces in which they are interested and ingest routes associated with the such community spaces.

In one aspect, a method includes receiving first network prefixes and first content identifiers from a first secondary content delivery network. The method also includes receiving second network prefixes and second content identifiers from a second secondary content delivery network and receiving, with a request router device, a content request from an end user device. The method further includes redirecting the content request to the first secondary content delivery network when a network address of the end user device matches one of the first network prefixes and a content identifier for the content request matches one of the first content identifiers and redirecting the content request to the second secondary content delivery network when a network address of the end user device matches one of the second network prefixes and a content identifier for the content request matches one of the second content identifiers.

In another aspect, a non-transitory computer-readable medium contains instructions. The instructions cause one or more programmable processors to receive first network prefixes and first content identifiers from a first secondary content delivery network. The instructions cause also cause the processors to receive second network prefixes and second content identifiers from a second secondary content delivery network. The instructions cause also cause the processors to receive, with a request router device, a content request from an end user device. The instructions cause also cause the processors to redirect the content request to the first secondary content delivery network when a network address of the end user device matches one of the first network prefixes and a content identifier for the content request matches one of the first content identifiers. The instructions cause also cause the processors to redirect the content request to the second secondary content delivery network when a network address of the end user device matches one of the second network prefixes and a content identifier for the content request matches one of the second content identifiers.

A content delivery network exchange includes a control unit having a processor. The content delivery network exchange also includes a communication module of the control unit to receive first network prefixes and first content identifiers from a first secondary content delivery network and to receive second network prefixes and second content identifiers from a second secondary content delivery network. The content delivery network exchange also includes a request router of the control unit to receive a content request from an end user device. The request router redirects the content request to the first secondary content delivery network when a network address of the end user device matches one of the first network prefixes and a content identifier for the content request matches one of the first content identifiers. The request router redirects the content request to the second secondary content delivery network when a network address of the end user device matches one of the second network prefixes and a content identifier for the content request matches one of the second content identifiers.

A content delivery network interconnection device includes a control unit having a processor. The content delivery network interconnection device also includes an application executing on the control unit. The content delivery network interconnection device also includes a routing protocol process, executing on the control unit, to execute a routing protocol to exchange routing protocol advertisements with a peer network device of one of a content delivery network exchange or a primary content delivery network in accordance with the routing protocol. The content delivery network interconnection device also includes an interface of the routing protocol process. The application invokes the interface to dynamically extend the routing protocol process to register transmit and receive interfaces for a code point of the routing protocol. The application invokes the interface of the routing protocol process to inject application data comprising first network prefixes and first content identifiers into the routing protocol. The routing protocol process transmits routing protocol advertisements with the transmit interface by transmitting routing protocol advertisements that comprise the application data and further comprise an application identifier associated with the transmit interface.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 4A-4B depict CDN-referral tables generated according to techniques described herein.

Like reference characters denote like elements throughout the figures and text.

DETAILED DESCRIPTION

Figure 1:
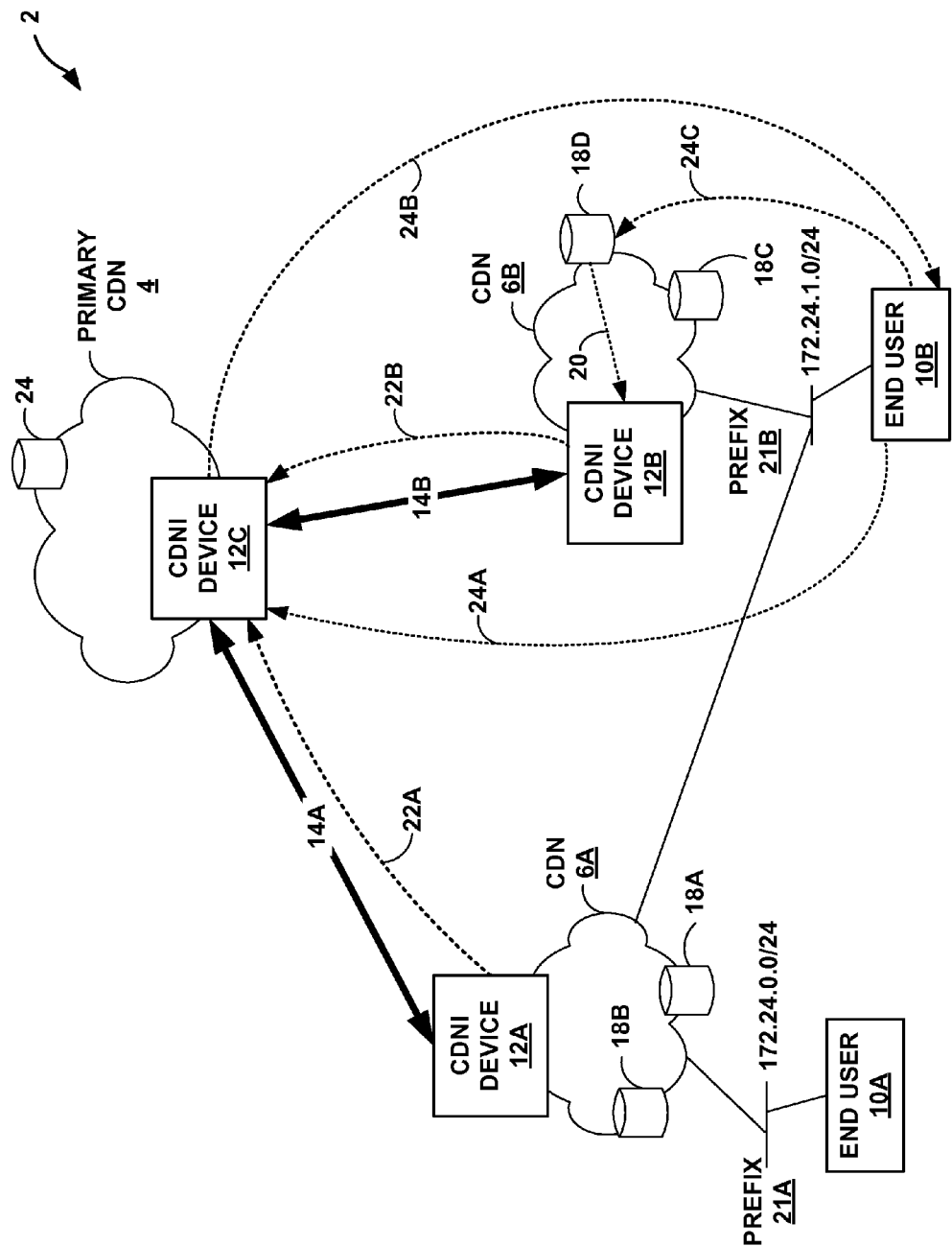
FIG. 1 is a block diagram illustrating a network system in which secondary content delivery networks advertise end user reachability and content availability information to a primary content delivery network in accordance with techniques of this disclosure.

FIG. 1 is a block diagram illustrating a network system in which secondary content delivery networks advertise end user reachability and content availability information to a primary content delivery network in accordance with techniques of this disclosure. Network system 2 includes secondary content delivery networks (CDNs) 6A-6B (collectively, "secondary CDNs 6") and primary CDN 4 each offering content delivery to end user devices 10A-10B (illustrated as "end users 10A-10B" and collectively referred to herein as "end user devices 10"). A system or device that offers "content delivery" to an end user device sends network packets containing content to the end user device. Although not illustrated for ease of illustration, devices of secondary CDNs 6, primary CDN 4, and end user devices 10 are connected by communication links, which includes any form of transport medium, wired or wireless, and can include intermediate nodes such as network devices.

Secondary CDNs 6 and primary CDN 4 each represent a network of interconnected devices that cooperate at layers four through seven (L4-L7) of the Open Systems Interconnection (OSI) model (i.e., the transport layer through the application layer) to deliver content items to end user devices 10 using one or more services. Such content items (hereinafter, "content") may include, for instance, streaming media files, data files, software, domain name system information, documents, database query results, among others. Accordingly, examples of services offered by secondary CDNs 6 and primary CDN 4 may include hyper-text transfer protocol (HTTP), media streaming, advertising, file transfer protocol (FTP), and others. Each of secondary CDNs 6 and primary CDN 4 operates over a network infrastructure (network infrastructure not shown in FIG. 1) that transports content requests, content data, and content metadata among between secondary CDNs 6 and primary CDN 4.

Network service providers (NSPs), CDN providers, and CSPs deploy CDNs to more efficiently deliver network services, such as Internet Protocol television (IPTV), video on demand (VoD), audio on demand, bulk data download, and other forms of content delivery. A CSP may contract the primary CDN 4 to offer a content service to one or more of end user devices 10. A content service, in general, encompasses the content delivery functionality of a CDN (partially provided in this example by primary CDN 4) but may also provide additional services, such as key distribution and TV program guides. The CSP may own or license content and stores such content on origin server 24 for delivery by origin server 24 or replication to secondary CDNs 6 for delivery by any of surrogates 18A-18D (collectively, "surrogates 18"). In some examples, a CDN provider deploys primary CDN 4 for use by one or more CSPs. In some examples, the CSP may deploy origin server 24 or other content serving entity without deploying a full CDN (e.g., primary CDN 4). The CSP may contract with a primary CDN 4 provider or the CSP may deploy/administer primary CDN 4 itself. Primary CDN 4 may alternatively be referred to as "authoritative" for the CSP.

Origin server 24 is a master repository for the CSP, and hence for primary CDN 4, to store all content made available to end user devices 10 as part of the content service provided by the CSP. Origin server 24 may include one or more data servers, web servers, application servers, databases, computer clusters, mainframe computers, and any other type of server, computing element, and/or database that may be employed by the CSP to facilitate the delivery of content from origin server 24 to surrogates 18 and/or directly to end user devices 10. In examples where a CDN provider other than the CSP deploys primary CDN 4, the CDN provider may operate primary CDN 4 by receiving and storing content provided by the CSP to origin server 24.

While all of secondary CDNs 6 and primary CDN 4 may in fact offer content delivery to each of prefixes 21 in that it is generally desirable that a given content item can be delivered to any of end user devices 10 from any of the CDNs of network system 2, the network reachability of primary CDN 4, for example, may not expand close enough to the location of end user devices 10 to realize the cost benefit and improved user experience that is provided by secondary CDNs 6. Consequently, primary CDN 4 contracts with secondary CDNs 6 to delegate content delivery for some or all of the content for prefixes 21A-21B (collectively, "prefixes 21"), and each of secondary CDNs 6 advertises those of prefixes 21 for which it seeks to provide a delegated content delivery service on behalf of primary CDN 4. The example of network system 2 is illustrative, and various examples may include fewer or additional elements arranged in various configurations.

In the illustrated example, while secondary CDN 6A advertises itself as offering content delivery for prefix 21A and prefix 21B, secondary CDN 6B advertises itself as offering content delivery for prefix 21A alone. A network address of end user 10A is a member of prefix 21A, and a network address of end user 10B is a member of prefix 21B.

Each of secondary CDNs 6 includes at least one of surrogates 18 and one of CDN Interconnection (CDNI) devices 12A-12C (collectively, "CDNI devices 12"). Primary CDN 4 includes CDNI device 12C and origin server 24. In some examples, primary CDN 4 includes one or more surrogates. Surrogates 18 store content made available by primary CDN 4 or secondary CDNs 6 to end user devices 10, to other devices of within CDN, and/or from primary CDN 4 to secondary CDNs 6. Surrogates 18 serve the content to requesting devices using, for example, a transmission control protocol (TCP) or user datagram protocol (UDP) session operating over intermediate devices of CDNs 6 and other network infrastructure connecting end user devices 10 to surrogates 18 (intermediate devices not shown for simplicity). CDN providers administer surrogates 18 to optimize content delivery using load balancing techniques, caching, request routing, and/or content services. Each of surrogates 18 may include one or more data servers, web servers, application servers, databases, computer clusters, mainframe computers, and any other type of server, computing element, and/or database that may be employed by the respective CDN provider to facilitate the provision of content. In some examples, the servers and/or databases may include "blades" or other cards that are inserted into large racks. The racks may provide a common backplane or switch fabric to interconnect the various servers and/or databases to one another as well as to a router or other network device. That is, any of surrogates 18 may be a service blade insertable within an associated router of an autonomous system associated with the respective one of primary CDN 4 or secondary CDNs 6. Any of surrogates 18 may aggregate or otherwise represent multiple caches that store content for different content providers or vendors.

Each of CDNI devices 12 may represent a server, router, other computing element or component thereof that distributes content delivery reachability information and/or performs request routing in accordance with techniques described herein. CDNI devices 12 may include DNS servers, other application-layer protocol (e.g., HTTP) servers or protocol speakers, application-layer traffic optimization servers and/or clients, and may in some instances execute routing protocols to receive, process, and advertise routing and content delivery reachability information.

As intimated above, secondary CDNs 6 may cache content closer to the edge of a network (i.e., closer to end user devices 10) to reduce transit delivery time and also to reduce network bandwidth usage for content delivery. In various examples, each of CDNs 6 may include a plurality of surrogates geographically dispersed to serve end user devices 10 that may be geographically diverse (e.g., located a significant distance from one another). Accordingly, costs to various surrogates 18 may differ by end user devices 10. Surrogates 18 may thus mirror a subset of the content available from origin server 24, where the "set" of content available from origin server 24 refers to the content files available to end user devices 10 from primary CDN 4 in this example, though each of surrogates 18 may provide different services and data content than that provided by the other surrogates. For example, surrogate 18C may store a different set of content items (e.g., different video, music, or other files) than is stored by surrogates 18A, 18B, or 18D.

End user devices 10 issue content requests to receive application-related content for applications hosted by end user devices 10. Each of end user devices 10 may represent, for example, a workstation, desktop computer, laptop computer, cellular or other mobile device, Personal Digital Assistant (PDA), gaming console, video or music console, television set-top box, or any other device capable of accessing a computer network via a wireless and/or wired connection. Each of end user devices 10 may be associated with a subscriber (e.g., a human that contracts with a CSP to receive content). Applications that access content services provided by CSP/CDN providers operating primary CDN 4 and secondary CDNs 6 may alternatively be referred to as "user agents."

Primary CDN 4 and secondary CDNs 6 use application-layer protocols for content distribution and make use of request routing techniques to direct application-layer content requests from end user devices 10 to associated surrogates 18, where "request routing" refers to selecting one of surrogates 18 with which to service a client request and directing the client request to the selected surrogate. The task of directing end user requests to cache nodes is alternately referred to as request routing, content routing or content redirection (hereinafter, "request routing"). Primary CDN 4 and secondary CDNs 6 may employ one or more of a variety of request routing techniques, including Domain Name Service (DNS) request routing and other forms of application-layer request routing.

In the case of DNS request routing, when one of end user devices 10 requests a content file through its network (not shown), the network forwards a DNS request to a domain name server that is configured to operate as a redirector, or "request router," for one of CDNs 6. In the illustrated example, CDN Interconnection (CDNI) devices 12 operate as request routers for associated primary CDN 4 or secondary CDNs 6. For example, CDNI device 12C operates as a request router for primary CDN 4, and CDNI device 12B operates as a request router for secondary CDN 6B. The DNS-based request router receives and resolves the domain name to select one of surrogates 18 or origin server 24 to serve the requested content, then returns the network address for the selected one of surrogates 18 or origin server 24 to the requesting one of end user devices 10 (typically via a local DNS server of the network (not shown) that provides network access to the requesting one of end user devices 10), which requests and receives the content from the selected one of surrogates 18 or origin server 24. In some cases however, as described in further detail below, CDNI device 12C of primary CDN 4 may delegate the content request to one of secondary CDNs 6. In some examples, providers of primary CDN 4 and secondary CDNs 6 deploy one or more request routers in separate appliances to use request routing information received by CDNI devices 12 for the respective CDNs.

In instances of other forms of application-layer request routing, when one of end user devices 10 requests a content file through a network using, for example, Hyper-Text Transfer Protocol (HTTP) or Real-Time Streaming Protocol (RTSP), the network forwards the request to a request router of one of CDNs 6. Again, CDNI devices 12 operate as request routers for associated CDNs. The request router selects one of surrogates 18 or origin server 24 to satisfy the request. The request router returns the network address for the selected one of surrogates 18 or origin server 24 to the requesting one of end user devices 10, which requests and receives the content from the selected one of surrogates 18 or origin server 24. As in the case of DNS-based request routing, the request router of primary CDN 4 may in some cases delegate the content request to one of secondary CDNs 6.

As described above, a provider of primary CDN 4 may enter into agreements with other providers of secondary CDNs 6 to delegate content delivery in accordance with a content service to a subset of end user devices 10 that engage the content service offered by the primary CDN 4 provider. For example, a delegating provider (which administers primary CDN 4) provides a content service to some or all of end user devices 10. The delegating provider may delegate the responsibility to serve at least a portion of content requests to a provider that deploys a delegated one of CDNs 6. The agreements may specify contractual duties of participating providers in what is known as a service level agreement (SLA), which may define a requisite service level that is to be applied by the delegated provider and other requisites.

Delegation in this manner defines a hierarchical relationship among CDNs 6. Primary CDN 4 that delegates content requests is an "upstream entity" to the "downstream entity" that may be one of secondary CDNs 6 and is delegated content requests from the upstream entity. The terms "upstream entity" and "downstream entity" may alternatively refer to the associated CSP, CDN provider, or NSP associated with the network that is the entity (e.g., one of primary CDN 4 or secondary CDNs 6). A "content serving entity" refers to any of primary CDN 4 and secondary CDNs 6 or, in some examples, a CSP network or data center that serves content to end user devices 10. Downstream entities and upstream entities may be content serving entities. The upstream entity can be a CSP or primary CDN 4. In some instances (not shown), a secondary CDN 6 may be both a downstream CDN and an upstream CDN for a tertiary CDN that servers one or more end user devices 10. That is, there may be a chain of delegation agreements cascading from top-level providers to intermediate-level CDN providers to lower-level network service providers. In this way, downstream entities may deliver content on behalf of upstream entities that receive corresponding content requests.

In accordance with techniques of this disclosure, secondary CDNs 6 advertise reachable prefixes 21 to primary CDN 4 using CDNI interfaces 14A-14B to advertise surrogates 18 offering content delivery reachability to prefixes 21 as well as content availability information for content items stored by the surrogates. As a result, the downstream entities may expose to primary CDN 4 those prefixes 21 and content items (as specified, e.g., by a Uniform Resource Identifier) for which particular surrogates 18 may serve the content items to the prefixes. In some instances, secondary CDNs 6 may advertise themselves as a whole, for example, by specifying a request router identifier rather than a particular surrogate. The request router may then receive redirected content requests for delegation for an associated one of surrogates 18.

CDNI devices 12A-12B receive lists of prefixes and list of content items served by respective secondary CDNs 6. CDNI devices 12A-12B may in some instances be configured with such lists of prefixes and content items by an administrator or may in some instances receive this information dynamically by executing routing protocols to receive the lists of prefixes and routing or other protocols extended to carry content item information issued by surrogates 18. That is, surrogates 18 may themselves advertise their individual prefix reachability and/or content items availability "footprint" to associated CDNI devices 12 for advertisement upstream to primary CDN 4. In some instances, all surrogates 18 of a given secondary CDN 6 have the same prefix reachability and thus advertise only content items availability. In some instances, all surrogates 18 of a given secondary CDN 6 have the same prefix reachability and content availability. In the illustrated example, surrogate 18 sends advertisement 20 to CDNI device 12B to advertise its prefix reachability and content availability information. Advertisement 20 includes at least one prefix and one content identifier and may represent, for instance, a routing protocol or application-layer message.

Pairs of CDNI devices 12 implement and use CDNI interfaces 14 to communicate content delivery reachability and content availability information and, in some cases, route content requests to downstream entities according to techniques described herein. For example, CDNI device 12B of secondary CDN 6B sends message 22B to communicate a representation of prefix 21B in combination with a list of content items to CDNI device 12C using CDNI interface 14B to indicate secondary CDN 6B provides content delivery reachability to devices having a network address that is within a range defined by prefix 21B (e.g., end user device 10B) for the listed content items. In addition, CDNI device 12A of secondary CDN 6A sends message 22A to communicate a representation of prefix 21A and prefix 21B in combination with a list of content items to CDNI device 12C using CDNI interface 14A to indicate secondary CDN 6A provides content delivery reachability to devices having a network address that is within the ranges defined by prefixes 21A, 21B for the listed content items. Both secondary CDNs 6 therefore provide prefix reachability to prefix 21B in this instance. Messages 22A, 22B may also include an identifier for an entity of respective secondary CDNs 6A, 6B that serves or further redirects content requests issued by one of end user devices 10. Messages 22A, 22B may represent, for instance, a routing protocol or application-layer message or an administrator entering the specified information to a web page provided by a web server of CDNI device 12C for upload to CDNI device 12C upon submission.

In accordance with techniques described herein, CDNI device 12C processes prefix reachability and content availability information received in CDNI interfaces 14 to generate a CDN-referral table, a data structure that maps a CDN-referral tuple space of composite keys, each including at least a prefix and a content item identifier, to respective surrogates 18 or request routers of secondary CDNs 6 (e.g., CDNI devices 12A, 12B). Each of the tuples in the CDN-referral table thus uniquely identifies a combination of prefix and content identifier combination and maps the combination to a logical identifier (e.g., a URI or network address) for a referred-to entity. Content identifiers may identify aggregations of content identifiers. For example, a URI of "www.domain.com/*" may identify every URI that includes a "www.domain.com" prefix substring (e.g., "www.domain.com/home.html"). Multiple tuples in the CDN-referral table may match a content request yet map to different referred-to entities in the same or different secondary CDNs 6.

CDNI device 12C may implement the CDN-referral table using one or more tables, trees, radix trees, databases, or other structures. Example implementations of a CDN-referral table are described with respect to FIGS. 4A-4B, below.

CDNI device 12C may route content requests issued by end user devices 10 using the generated CDN-referral table. For example, CDNI device 12C having received a representation of prefix 21B and a list of content items in CDNI interface 14B, and having accordingly generated a CDN-referral table may redirect content requests issued by end user device 10B for any of the list of content items to secondary CDN 6B, more specifically, to CDNI device 12B or one of surrogates 18AC, 18D. Alternatively, CDNI device 12C may determine the requested content item is not available from secondary CDN 6B and therefore redirect the content request to secondary CDN 6A. Alternatively, CDNI device 12C may determine the requested content item, though available from both secondary CDNs 6 (along with end user 10B), may be better served by secondary CDN 6A for reasons of cost, user experience, and so forth as determined by topological and cost information known to CDNI device 12C. Additional details regarding downstream CDN selection based on topological and cost information are found in Medved et al., U.S. patent application Ser. No. 13/341,662, "ADVERTISING END-USER REACHABILITY FOR CONTENT DELIVERY ACROSS MULTIPLE AUTONOMOUS SYSTEMS," filed Dec. 30, 2011, the entire contents of which being incorporated herein.

In the illustrated example, end user device 10B issues content request 24A to CDNI device 12C deployed by as part of primary CDN 4. CDNI device 12C matches the network address for end user device 10B in combination with an identifier for the requested content to a tuple in the CDN-referral table, and uses the matched tuple to determine a referred-to entity. In this case, the matching tuple specifies surrogate 18D of secondary CDN 6B. Accordingly, CDNI device 12C delegates content request 24A to surrogate 18B using redirect message 24B to end user 10B. In some examples, redirect message 24B may represent a DNS A/AAAA record toward surrogate 18D. In the illustrated example, redirect message 24B represents an HTTP 302 redirect message or DNS reply to end user device 10B. Upon receiving redirect message 24B, end user device 10B may connect directly to surrogate 18D to request and receive the requested content directly from surrogate 18D.

In some examples, CDNI devices 12 implement prefix reachability and content availability information advertisements for CDNI interfaces 14 using Multi-Protocol Border Gateway Protocol (MP-BGP) or another exterior routing protocol. For example, CDNI devices 12 may establish BGP peering sessions with one another. A CDNI device 12 for a downstream entity may then send one or more BGP UPDATE messages that include prefixes reachable and a list of content available by the downstream entity to a peer CDNI device 12 for an upstream entity. BGP peering sessions for CDNI interfaces 14 may be established out-of-band from the routing plane of network system 2 to mitigate the possibility of leaking content delivery information for CDNs 6 into BGP routing tables for the network. In this way, CDNI devices 12 may maintain a separation between the network layer (layer three (L3) of the OSI model) and content delivery network layers (i.e., L4-L7). In some examples, however, one or more of CDNI devices 12 may represent network routers and send BGP UPDATE messages in-band with a flag, application-specific Network Layer Reachability Information (NLRI) or other indicator that the BGP UPDATE messages include prefix reachability and content availability information for content delivery network content request delegation. As a result, the receiving CDNI devices 12 or any routers that receive the BGP messages do not install the routes (for the reachable prefixes) to the BGP routing tables.

The generation and use of a CDN-referral table by CDNI device 12C based on advertised CDN-referral tuples may enable reduction in the number of content request redirections by exposing content availability on individual media caches of secondary CDNs 6 for prefixes 21 and thus increasing the granularity of the lookup data structure on which redirection is based. For example, although each of secondary CDNs 6 provides prefix reachability to prefix 21B including end user 10B, there may be some cases in which only secondary CDN 6B includes a surrogate that stores the requested content. To reduce latency and generally improve a user experience, CDNI device 12C may therefore use the techniques described above to look up a composite key of the CDN-referral tuple space that maps to surrogate 18D and accordingly redirect the content request to surrogate 18D.

Figure 2:
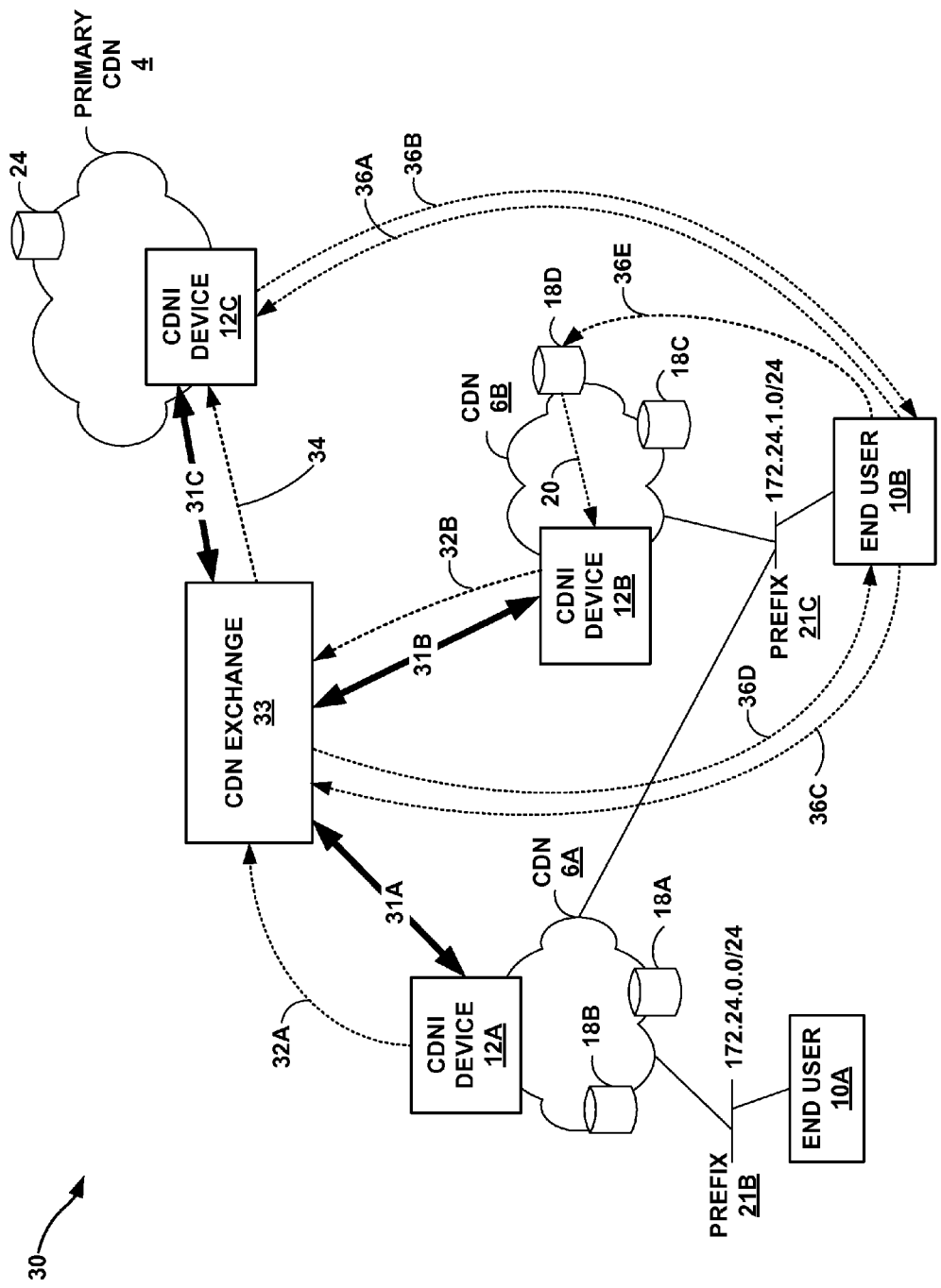
FIG. 2 is a block diagram illustrating an example network system that includes a content delivery network exchange in accordance with techniques described herein.

FIG. 2 is a block diagram illustrating an example network system 30 that includes a content delivery network exchange in accordance with techniques described herein. In this example, CDN exchange 33 mediates the propagation of prefix reachability and content availability information between secondary CDNs 6 and primary CDN 4.

CDN exchange 33 may include one or more data servers, web servers, application servers, databases, computer clusters, mainframe computers, and any other type of server, computing element, and/or database that may be employed by a CDN exchange provider to facilitate upstream prefix reachability and content availability information propagation. CDNI device 12B of secondary CDN 6B sends message 32B using CDNI interface 31B to communicate a representation of prefix 21B in combination with a list of content items to CDN exchange 33 to indicate secondary CDN 6B provides content delivery reachability to devices having a network address that is within a range defined by prefix 21B (e.g., end user device 10B) for the listed content items. CDNI device 12A of secondary CDN 6A sends message 32A using CDNI interface 14A to communicate a representation of prefix 21A and prefix 21B in combination with a list of content items to CDN exchange 33 to indicate secondary CDN 6A provides content delivery reachability to devices having a network address that is within the ranges defined by prefixes 21A, 21B for the listed content items. Messages 32A, 32B may also include an identifier for an entity of respective secondary CDNs 6A, 6B that serves or further redirects content requests issued by one of end user device 10. Messages 22A, 22B may represent, for instance, a routing protocol or application-layer message or an administrator entering the specified information to a web page provided by a web server of CDNI device 12C for upload to CDNI device 12C upon submission.

CDN exchange 33 and CDNI device 12C exchange at least control information and/or request routing information using CDNI interface 31C. In some examples, CDN exchange 33 operates as a conduit for CDN-referral tuples to be propagated to primary CDN 4. CDNI devices 12A, 12B use respective CDNI interfaces 31A, 31B to upload their respective prefix spaces and content item availability information to CDN exchange, which processes the uploaded information to generate a CDN-referral table. CDN exchange 33 issues CDN-referral table upload message 34 to forward the CDN-referral table to CDNI device 12C of primary CDN 4. CDNI device 12C may then respond to content requests issued by end user devices 10 in the manner described above with respect to FIG. 1.

In some examples, CDN exchange 33 obfuscates prefix or tertiary CDN reachability and/or content information availability information provided by secondary CDNs 6 via CDNI interfaces 31A, 31B. CDN exchange 33 in such examples, rather than merely propagating CDN-referral tuples as a CDN referral table upstream toward CDNI device 12C, replaces the referred-to entity in the CDN-referral tuples with an identifier for itself (i.e., for CDN exchange 33). As a result, CDNI device 12C redirects content requests that match on any of the CDN-referral tuples of the CDN-referral table to CDN exchange 33 rather than to secondary CDNs 6.

CDN exchange 33 operating as an obfuscator may maintain separate CDN-referral tables: a first table including aggregated prefix reachability and content availability information that CDN exchange 33 publishes to upstream devices of primary CDNs (e.g., CDNI device 12C of primary CDN 4), and a second table including internal CDN-referral tuples received from secondary CDNs 6 that maintains the unmodified referred-to entities (i.e., surrogates 18 or CDNI devices 12 of secondary CDNs 6). To produce the aggregate table, CDN exchange processes CDN-referral tuples into aggregated ranges, where possible, and replaces the referred-to entity with an identifier for CDN exchange 33. An identifier for CDN exchange 33 may include a network address or URI. CDN exchange 33 issues CDN-referral table upload message 34 to forward the aggregate CDN-referral table to CDNI device 12C of primary CDN 4. CDNI device 12C may then respond to content requests issued by end user devices 10 in the manner described above with respect to FIG. 1, which leads CDNI device 12C to redirect content requests to CDN exchange 33.

In the illustrated example, end user device 10B issues content request 36A to CDNI device 12C operating as a request router for primary CDN 4. CDNI device 12 keys the request content identifier and end user device 10B network address to the composite key of the aggregate CDN-referral table received from CDN exchange 33, which maps to CDN exchange 33, and CDNI device 12 returns content redirect message 36B specifying CDN exchange 33 to end user 10B. End user 10B issues content request 36C to CDN exchange 33, which keys the content request to a matching internal CDN-referral tuple in the internal CDN-referral table. The matching internal CDN-referral tuple specifies surrogate 18D of secondary CDN 6B, and CDN exchange 33 returns content redirect message 36D to end user 10B. Upon receiving content redirect message 36D, end user device 10B may connect directly to surrogate 18D to request and receive the requested content directly from surrogate 18D.

CDN exchange 33 operating as an obfuscator may in some instances assume a role of a primary CDN vis-à-vis a content service provider. For example, a CSP that operates origin server 24 may mirror content to surrogates 18 and contract request routing to CDN exchange 33. In effect, the CSP provides origin server 24 to deliver content to secondary CDNs 6 and primary CDN 4 would not exist in such instances.

CDN exchange 33 may operate as a clearinghouse for information exchange for CDN Interconnections between multiple secondary CDNs and multiple primary CDNs, thus reducing a burden on each of the CDNs for advertising and/or receiving prefix reachability and content availability information to/from multiple CDNs. Rather, each of the CDNs may interface with CDN exchange 33, which processes upstream advertisements to maintain an up-to-date CDN-referral table for publication to upstream primary CDNs.

Although aggregating prefixes may increase a complexity of a distributed CDN system to map a given end user device to one of secondary CDNs 6 or specific surrogates 18, the CDN exchange may significantly reduce the operational overhead for primary CDN 4 by offloading responsibility for managing potentially tens or even hundreds of CDNI interfaces to secondary CDNs to CDN exchange 33. In addition, because CDN exchange 33 operating as an obfuscator of secondary CDNs 6 may have increased trust with the secondary CDNs 6 versus a secondary CDN-primary CDN relationship, secondary CDNs 6 may provide finer-granularity CDN-referral tuples to CDN exchange 33 than would be provided to primary CDN 4. For example, secondary CDN 6B may provide CDN-referral tuples specifying individual surrogates 18C, 18D rather than CDNI device 12 acting as a route reflector. As a result, content redirection may be handled by network system 30 with the same number of request-redirect steps as with network system 2 of FIG. 1 that does not incorporate CDN exchange 33.

Figure 3:
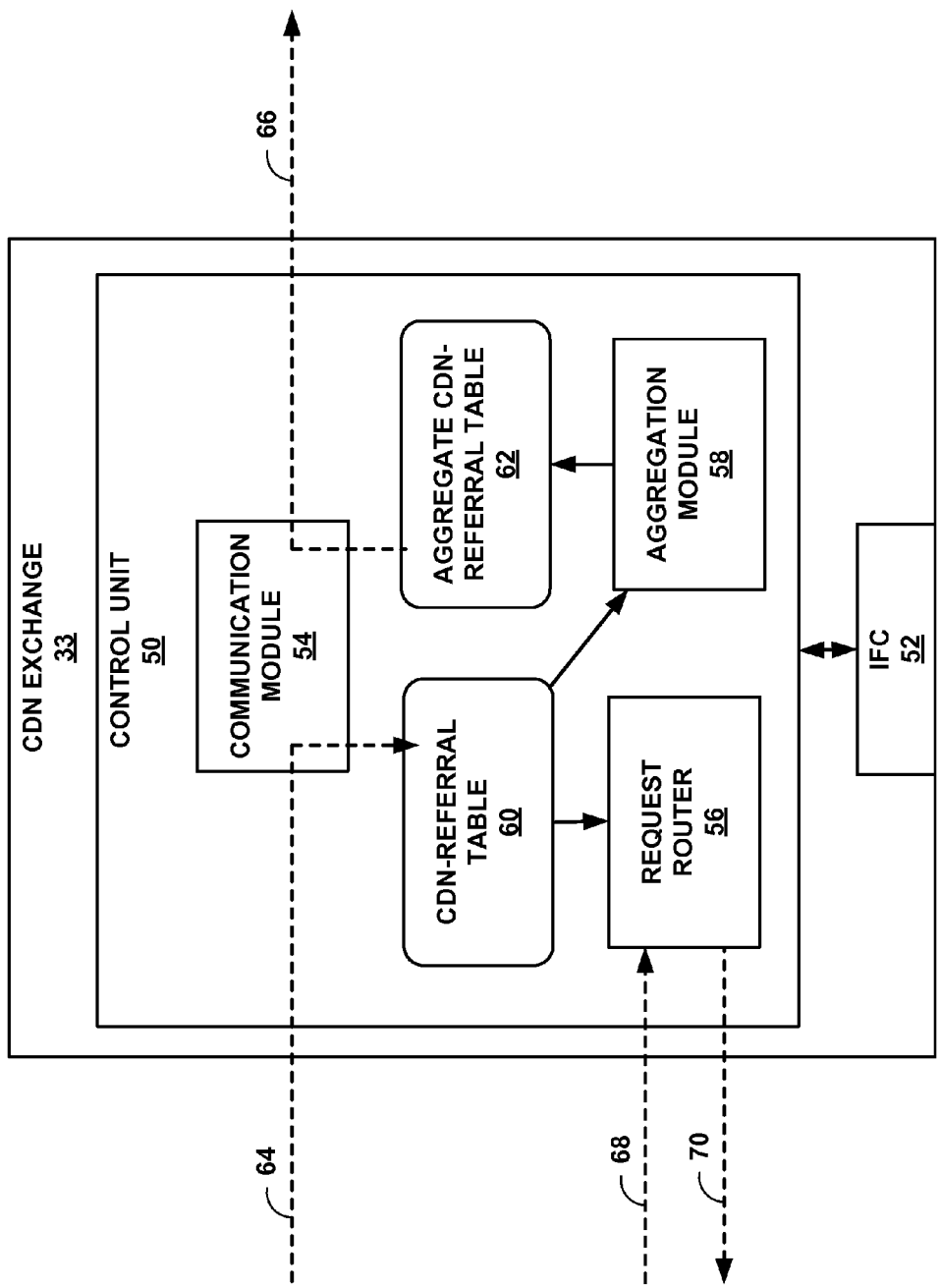
FIG. 3 is a block diagram illustrating an example instance of a content delivery network (CDN) exchange in detail.

FIG. 3 is a block diagram illustrating an example instance of CDN exchange 33 in detail. CDN exchange 33 includes a control unit 50 coupled to a network interface card (IFC) 52. Control unit 50 may include one or more processors (not shown in FIG. 3) that execute software instructions, such as those used to define one or more software or computer programs, stored to a computer-readable storage medium (again, not shown in FIG. 3), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 50 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Control unit 50 sends and receive network packets via IFC 52, which may represent one or more interface cards in various instances of CDN exchange 33.

Communication module 54 of control unit 50 receives prefix reachability and content availability information in advertisements 64 from secondary CDNs for processing and forwarding upstream in a representation to one or more primary CDNs. Communication module 54 stores the received information as CDN-referral tuples to CDN-referral table 60. In this instance, aggregation module 58 of control unit 50 aggregates prefix reachability and content availability information and stores the aggregated information to a separate table, i.e., aggregate CDN-referral table 62. Aggregation module 58 may replace referred-to entities of CDN-referral tuples taken from CDN-referral table 60 with an identifier for CDN exchange 33 when generating aggregate CDN-referral table 62. The identifier may include a URI or a network address of CDN exchange 33, for instance.

Communication module 54 publishes aggregate CDN-referral table 62 by sending CDN-referral table upload message 66 to upstream entities, such as primary CDNs. CDN-referral table upload message 66 may represent an example of CDN-referral table upload message 34 of FIG. 1.

In some instances, as described in further detail with respect to FIG. 5 below, communication module 54 represents a routing protocol module that executes a routing protocol, such as MP-BGP, to send/receive routing protocol advertisements, represented by advertisements 64 and CDN-referral table upload message 66, that are extended in accordance with the techniques of this disclosure to carry prefix reachability and content availability information. In some instances, communication module 54 includes a web server that serves a web page to a web browser by which an administrator for a secondary CDN may upload prefix reachability and content availability information to CDN exchange 33. In some instances, communication module 54 includes a management interface that presents a command-line or other interface by which an administrator for a secondary CDN may upload prefix reachability and content availability information to CDN exchange 33.

In some examples, communication module 54 executes an application-layer traffic optimization protocol, such as the Application-Layer Traffic Optimization (ALTO) protocol. Secondary CDN providers may provide an Application-Layer Traffic Optimization (ALTO) protocol service to provide guidance to CDN exchange 33 regarding selection of an origin server, a particular surrogate, or a downstream entity (such as one of CDNI devices 12 for secondary CDNs 6 of FIGS. 1-2) for content request delegation. The ALTO service may provide information that incorporates provider preferences with regard to network resources to influence network resource consumption patterns while maintaining or improving application performance.

In some examples, an ALTO server of the CDNI device 12 of one of secondary CDNs 6 receives prefix reachability and content availability information for the entity, which the ALTO server uses to generate a network map. The ALTO server also generates a corresponding cost map for the network map using, for example, topology information that may include traffic engineering (TE) information and SLAs with other providers. The ALTO service and ALTO protocol is described in further detail in J. Seedorf et al., RFC 5693, "Application-Layer Traffic Optimization (ALTO) Problem Statement," Network Working Group, the Internet Engineering Task Force draft, October 2009; and R. Alimi et al., "ALTO Protocol: draft-ietf-alto-protocol-06.txt," ALTO Working Group, the Internet Engineering Task Force draft, October 2010, each of which is incorporated herein by reference in its entirety. In some instances, CDNI devices 12 may receive topology and/or traffic engineering information for the network in BGP routing advertisements. One example of this techniques is described in Gredler et al., "North-Bound Distribution of Link-State and TE Information using BGP," draft-gredler-idr-ls-distribution-01, Mar. 12, 2012, which is incorporated by reference herein in its entirety.

For example, an ALTO server of the CDNI device 12 for the entity may be configured by a secondary CDN provider with prefixes or may receive prefixes in a prefix reachability advertisement (e.g., a BGP UPDATE message or IGP advertisement). The ALTO server arranges the prefixes into a network map that specifies a set of topological groupings, or "PIDs," defined by the ALTO server for at least a portion of the network. A particular PID within a network map may represent a single device or device component, a collection of devices such as a network subnet identified by a network address prefix. A cost map for a corresponding network map may reflect a combination of topological costs and/or provider preferences. The cost map specifies costs respecting inter-PID content delivery costs for connections among the various PIDs of the network map. That is, for each pair of PIDs in the network map, the cost map specifies a content delivery cost between respective devices represented in each of the member PIDs of the PID pair. In some instances, where a first member PID of a PID pair in the network map represents devices that are not reachable from the second member PID of the PID pair, the cost specified in the cost map from the first member PID to the second member PID may be infinite or, in some cases, empty. Provider preferences may correspond to SLAs with other providers or may be received from other providers in an ALTO cost map received from a downstream entity. Accordingly, provider preferences may include price per megabyte or other transport costs, for example. Topological costs may include traffic engineering information such as bandwidth availability, delay (latency), and path bandwidth, among other cost types.

In some instances, the ALTO server may generate a supplemental content cost map for the network map, where PIDs of the network map are associated with nodes of the cost map. For the content cost map, where a particular content item is unavailable from a particular PID, the cost map specified in the cost map to this PID from any of the other PIDs is infinite to signify the content item's unavailability to this PID.

Communication module 54 sends ALTO requests to the ALTO server of secondary CDNs 6 to obtain the network map and the cost map. Using the network map and cost map provided by an ALTO server of a downstream CDNI device 12, CDN exchange 33 (or a CDNI device 12 of an upstream entity such as primary CDN 4 of FIGS. 1-2) may select serving resources to minimize costs, as specified by the ALTO maps, between content requesting end user devices 10 and available resources of the upstream entity or downstream CDNs. CDN exchange 33 may consolidate ALTO network maps, cost maps, and content cost maps from multiple secondary CDNs and output the master ALTO maps as a CDN-referral table to primary CDN 4 by CDN-referral table upload message 66. When, for instance, CDNI device 12C of primary CDN 4 receives a DNS query from one of end user devices 10, the CDNI device 12C uses one or more cost maps provided by secondary CDNs and/or CDN exchange 33 to select a lowest-cost (as determined by provider preferences) node at which to direct the DNS query for the requesting end user 10, where the determined node may be a CDNI device 12 of one of secondary CDNs 6 (which may perform additional redirection), one of surrogates 18, or origin server 24. CDNI device 12C redirects the DNS query to the determined node for the subscriber and returns a network address for the determined node. In this manner, the techniques may allow CDN providers and CSPs to improve content delivery and serving node selection among CDNs.

Additional information regarding generation and use of ALTO network and cost maps are found in Medved et al., U.S. patent application Ser. No. 12/861,671, entitled "APPLICATION-LAYER TRAFFIC OPTIMIZATION SERVICE ENDPOINT TYPE ATTRIBUTE," filed Aug. 23, 2010; Penno et al., U.S. patent application Ser. No. 12/861,645, entitled "APPLICATION-LAYER TRAFFIC OPTIMIZATION SERVICE SPANNING MULTIPLE NETWORKS," filed Aug. 23, 2010; R. Penno et al., "ALTO and Content Delivery Networks: draft-penno-alto-cdn-03," Network Working Group, the Internet Engineering Task Force draft, March 2011; and Medved et al., U.S. patent application Ser. No. 12/982,153, entitled "DYNAMICALLY GENERATING APPLICATION-LAYER TRAFFIC OPTIMIZATION PROTOCOL ENDPOINT ATTRIBUTES," filed Dec. 30, 2010, the entire contents of each of which are incorporated herein by reference.

Request router 56 of CDN exchange 33 receives content requests 68. In response, request router 56 queries CDN-referral table 60 having the finer-granularity tuples specifying referred-to entities of secondary or tertiary CDNs using the composite keys of content requests 68, which include the issuing device and an identifier for the requested content, to identify the referred-to entities mapped to the composite keys in CND-referral table 60. Request router 56 issues content redirect messages 70 specifying the referred-to entities identified for content requests 68. In some instances, request router 56 and communication module 54 of CDN exchange 33 may be executed by separate devices deployed by a CDN exchange provider.

FIG. 4A is a block diagram illustrating a CDN-referral table generated according to techniques described herein. CDN-referral table 80 may represent an example of CDN-referral table 60 of FIG. 3. CDN-referral table 80 includes prefix column 82A specifying reachable prefixes, Uniform Resource Identifier (URI) column 82B specifying available content, and cache URI column 82C specifying a referred-to entity for the composite key made up of the corresponding prefix column 82A and URI column 82B values. That is, each of CDN-referral table rows 84A-84N (collectively, "CDN-referral table rows 84") includes a CDN-referral tuple with a composite key and a referred-to entity. A request router, e.g., request router 56 of CDN exchange 33 of FIG. 3, receives content requests that each specify the device requesting the content and an identifier for the requested content. The request router attempts to map the device to prefix column 82A and further attempts to map the identifier to URI column 82B. Upon identifying a matching one of CDN-referral table rows 84A-84N, the request router redirects the content request to the referred-to entity in cache URI column 82C of the matching row. CDN-referral table row 84N specifies wildcard values for the composite key. The request router refers content requests that do not map to any of the composite keys of the other CDN-referral table rows 84 to the origin server of the primary CDN, which is ultimately responsible for the content delivery service.

For example, an end user device with a network address that is a member of prefix P1 may request a content item with a URI of www.domain.com/video/12345. The request router receives and maps the content request to CDN-referral table row 84B and redirects the content request to a surrogate having a URI of www.cdn.secondary-B.1.com, as indicated by the value of the cache URI column 82C for CDN-referral table row 84B. Although CDN-referral table row 84A also matches CDN-referral table row 84A, the request router in this instance selects the finer-granularity URI value of CDN-referral table row 84B. The secondary CDN that includes the surrogate having a URI of www.cdn.secondary-B.1.com is better suited to serve content for the finer-granularity URI value.

In some examples, a device utilizing CDN-referral table 80 may implement CDN-referral table 80 using radix trees or other similar trees (e.g., Patricia trees). The main prefix tree includes prefix nodes for values of prefix column 82A. The value of a prefix node maps to a URI tree that includes URI nodes for values of URIs for the prefix node key. The value of a URI node is the value of the cache URI column 82C for the matching composite key corresponding to the URI node value and the prefix node value. In the example of CDN-referral table 80, a prefix node keyed to prefix P1 may map to a URI tree having URI nodes keyed to www.domain.com/video/ and www.domain.com/, respectively. In this way, a request router may efficiently "drill down" to the value of the referred-to entity by walking the prefix tree to identify the finest-granularity matching prefix node, then walking the URI tree to identify the finest-granularity matching URI node.

FIG. 4B is a block diagram illustrating an aggregate CDN-referral table generated according to techniques described herein. Aggregate CDN-referral table 80 may represent an example of aggregate CDN-referral table 62 of FIG. 3. Aggregate CDN-referral table 86 includes prefix column 87A specifying reachable prefixes, Uniform Resource Identifier (URI) column 87B specifying available content, and cache URI column 87C specifying a referred-to entity for the composite key made up of the corresponding prefix column 87A and URI column 87B values. That is, each of aggregate CDN-referral table rows 88A-88N (collectively, "aggregate CDN-referral table rows 88") includes a CDN-referral tuple with a composite key and a referred-to entity. A request router, e.g., request router 56 of CDN exchange 33 of FIG. 3, receives content requests that each specify the device requesting the content and an identifier for the requested content. The request router attempts to map the device to prefix column 87A and further attempts to map the identifier to URI column 87B. Upon identifying a matching one of CDN-referral table rows 88A-88N, the request router redirects the content request to the referred-to entity in cache URI column 87C of the matching row. Aggregate CDN-referral table row 88N specifies wildcard values for the composite key. The request router refers content requests that do not map to any of the composite keys of the other CDN-referral table rows 88 to the origin server of the primary CDN, which is ultimately responsible for the content delivery service.

A CDN exchange, such as CDN exchange 33 of FIG. 3, generates aggregate CDN-referral table 86 from CDN-referral table 80. In this instance, the CDN exchange merges CDN-referral table rows 84A-84C into aggregate CDN-referral table row 88A on both dimensions of the composite key. The CDN exchange merges prefixes P1 and P2 into an aggregate range P1, P2, and further merges www.domain.com/video/* and www.domain.com/* into the aggregate range of the broader URI prefix that is www.domain.com/*. In addition, the CDN exchange replaces the cache URI values with its own URI of www.cdn.exchange.com. As a result, aggregate CDN-referral table row 88A refers all content requests that match any of CDN-referral table row 84A-84C to the CDN exchange, which effectively masks the granular prefix reachability and content availability information that is included in CDN-referral table 80.

Figure 5:
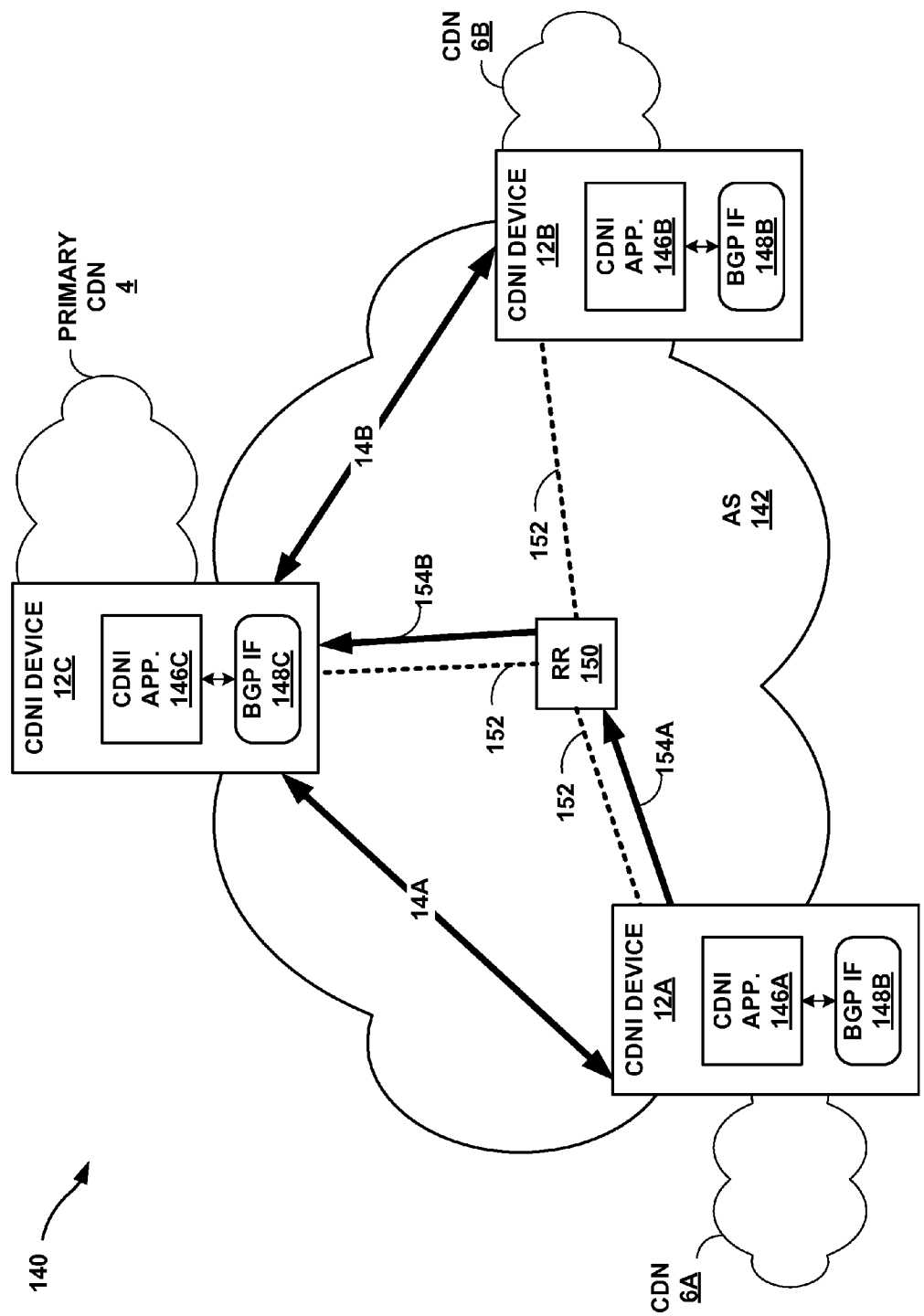
FIG. 5 is a block diagram illustrating a network system including CDN Interconnect (CDNI) devices to distribute CDNI-related application data using an interface to an extensible routing protocol according to techniques described herein.

FIG. 5 is a block diagram illustrating a network system including CDNI devices to distribute CDNI-related application data using an interface to an extensible routing protocol according to techniques described herein. Network system 140 may represent an example of network system 2 of FIG. 1 in further detail and includes autonomous system (AS) 142 interconnected by internal communication links (not shown). The term "communication link," as used herein, comprises any form of transport medium, wired or wireless, and can include intermediate nodes such as network devices. Network system 140 may in some instances include multiple ASes arranged in various topologies and interconnected by external communication links to AS border routers of the ASes. Network system 140 may in this respect represent the Internet or any other publicly accessible computer network, a private network, or a virtual private network (VPN).

Autonomous system 142 runs one or more interior gateway protocols (IGPs), such as Open Shortest Path First (OSPF), Routing Information Protocol (RIP), Intermediate System-to-Intermediate System (IS-IS), Interior Gateway Routing Protocol (IGRP), Enhanced IGRP (EIGRP), and Interior Border Gateway Protocol (iBGP), and AS 142 includes a set of one or more routers operating within a single administrative domain according to a routing policy (interior routers not shown for ease of illustration). Autonomous system 142 has an identification number provided by an Internet registry or by an Internet service provider (ISP) that uniquely identifies the autonomous system to other autonomous systems. In various embodiments, AS 142 may represent a service provider network, an enterprise or campus network, or a content access network (CAN), for example. In addition, a service providers, content provider, or enterprise/campus network administrator may administer AS 142.

Routers of AS 142 implement a routing protocol to route packets from source network addresses to destination network addresses, and AS 142 may offer network packet delivery to a network (or subnet) of one or more endpoints identified by a network address prefix that encompasses the network address range defined by the network addresses of endpoints. Although the techniques of this disclosure may be applied with respect to multiple different routing protocols, the techniques are generally described hereinafter with respect to Multiprotocol BGP (MP-BGP), a routing protocol that defines extensions to BGP for IPv4 (i.e., BGP-4) for carrying routing information for multiple different network layer protocols. MP-BGP overloads BGP routing protocol advertisements with attributes that define Network Layer Reachability Information (NLRI) that routers of AS 142 may use to advertise routing information associated with multiple different network layer protocols. Network layer protocols may include Internet Protocol version 4 (IPv4), Internet Protocol version 6 (IPv6), Layer Two Virtual Private Networking (L2VPN), Layer Three VPN (L3VPN), and BGP with Traffic Engineering extensions (BGP-TE).

Routers of AS 142 specify, for each multiprotocol NRLI included in a BGP routing protocol advertisement, a "code point" that is associated with a network layer protocol. For example, a multiprotocol NLRI carried in a BGP routing protocol advertisement may specify a code point for IPv4, in which case the multiprotocol NLRI carries routing information, e.g., routes, for IPv4. An example description of a type of MP-BGP is included in T. Bates et al., "Multiprotocol Extensions for BGP-4," Request for Comments 4760, Network Working Group, Internet Engineering Task Force, January, 2007, which is incorporated by reference herein in its entirety (hereinafter referred to as "RFC 4760"). Multiprotocol NLRI may include the Multiprotocol Reachable NLRI (MP_REACH_NLRI) and Multiprotocol Unreachable NLRI (MP_UNREACH_NLRI) described in Bates et al., referenced above. A code point may be identified by a combination of an AFI and a Subsequent AFI (SAFI) in Multiprotocol Reachable and Multiprotocol Unreachable NLRI, as described in RFC 4760.

CDNI devices 12A-12C of primary CDN 4 and secondary CDNs 6 may represent the corresponding entities of FIG. 1. CDNI devices 12A-12C are BGP speakers that each execute MP-BGP and establish BGP peering sessions 152 with route reflector 150 to advertise CDNI information using MP-BGP to implement aspects of CDNI interfaces 14A, 14B. Route reflector 150 is a BGP speaker that re-advertises (or "reflects") routes received from other BGP speakers to enable the BGP speakers to avoid forming a mesh of peering sessions 152. In some instances, CDNI devices 12A, 12C and CDNI devices 12B, 12C peer with one another to advertise CDNI information and implement CDNI interfaces 14A, 14B directly, rather than indirectly via route reflector 150. CDNI information may refer to prefix reachability and content availability information advertised by secondary CDNs 6 upstream to primary CDN 4.

Routing protocol advertisements issued by CDNI devices 12 and route reflector 17 may represent, for example, BGP UPDATE messages. In conventional BGP, a BGP UPDATE message associates a network layer protocol prefix with a NEXT_HOP for the prefix and a list of autonomous systems that must be traversed to reach the prefix ("AS_PATH" in BGP UPDATE messages).

In accordance with techniques described herein, CDNI devices 12A-12C include respective BGP interfaces 148A-148C (illustrated as BGP IFs 148A-148C and collectively referred to herein as "BGP interfaces 148") that enable respective CDNI applications 146A-146C (collectively, "applications 146") to modify the operation of MP-BGP by CDNI devices 12 to effect dynamic, CDNI information distribution for CDNI applications 146, as well as for other applications.

BGP interface 148A, for example, includes methods and parameters that permit CDNI application 146A executing on CDNI device 12A to dynamically create new transmit and receive interfaces associated with new or existing code points for MP-BGP for use by the CDNI application 146A for CDNI information distribution. A new code point may represent an AFI/SAFI combination that is not previously associated in CDNI device 12A with an application and/or with a network layer protocol. Put another way, the new code point is not pre-defined in the implementation of MP-BGP developed by the vendor of CDNI devices 12A. Such an implementation may, for instance, pre-define code points for well-known network layer protocols (e.g., IPv4, IPv6, L2VPN, and so on) and provide well-defined interfaces to applications executing on CDNI device 12A that seek to make use of network layer information exchanged by CDNI device 12A in accordance with those protocols. Furthermore, although the new code point refers to an AFI/SAFI combination in keeping with the conventional uses of BGP (i.e., distributing network layer reachability information (e.g., routes to network layer endpoints)), CDNI application 146A may register the new code point and/or transmit/receive interfaces for use in distributing application data that may be more loosely related or even unrelated to network layer protocols.

Upon creating the new transmit and receive interfaces, CDNI application 146A may invoke BGP interface 148A to inject CDNI information into the MP-BGP process of CDNI device 12A, which then distributes the injected application data to BGP peers in attributes in a BGP UPDATE message that specifies the code point for the interfaces created by CDNI application 146A. The BGP UPDATE message may further include an application identification tag that is associated with the new interfaces for the code point and that identifies application-defined NLRI within the message. That is, CDNI devices 12 seeking to advertise CDNI information may inject a custom, application-defined NLRI according to a data definition associated with a code point into MP-BGP. CDNI devices 12 use BGP interfaces 148 to receive CDNI information by extract the custom, application-defined NRLI from MP-BGP and passing the NLRI to CDNI applications 146. In addition, upon creating new transmit and receive interfaces for CDNI applications 146, CDNI devices 12 trigger BGP capability negotiation for the new NLRI such that the existing vendor-implemented MP-BGP process can support the application-defined NLRI and signal to one another their support for the application-defined NLRI for CDNI applications 146.

In some cases, one or more of the path attributes of the BGP UPDATE message may be transmitted/received via BGP interfaces 148 as opaque Type-Length-Value objects for distribution along with the network layer prefixes. In this way, intermediate routers of AS 142 and route reflector 150 may accept and distribute path attributes that are not comprehensible to their respective BGP implementations. A vendor of CDNI applications 146 may elect to register any of the path attributes with the Internet Assigned Numbers Authority (IANA).

CDNI applications 146 may invoke respective BGP interfaces 148 to associate newly-defined transmit and receive interfaces with one or more pre-existing or newly-defined BGP communities. The BGP communities define the distribution graphs for CDNI information injected into MP-BGP. In the illustrated example, CDNI applications 146 may associate their respective transmit and receive interfaces with BGP communities to cause CDNI device 12C to ingest CDNI information advertised by CDNI devices 12A, 12B, but not vice-versa. In this way, CDNI devices 12A, 12B of secondary CDNs 6 advertise CDNI information upstream to CDNI device 12C of primary CDN 4. Some examples of network system 140 may include a CDN exchange, as in the example of network system 30 of FIG. 2.

In the illustrated example, CDNI application 146A invokes BGP interface 148A to inject CDNI information in the MP-BGP process of CDNI device 12A, which responsively issues BGP UPDATE message 154A to route reflector 150 that includes NLRI that specifies the code point associated with by CDNI application 146A. Route reflector 150 reflects BGP UPDATE message 154A as BGP UPDATE message 154B to CDNI device 12C. CDNI device by BGP interface 148C may then deliver the CDNI information to CDNI application 146c for processing. As indicated above, route reflector 150 may be unable to interpret the CDNI information included in BGP UPDATE messages 154A-154B for use in routing or other applications. Nevertheless, route reflector 150 reflects the application-defined application data which it is unable to interpret.

BGP interfaces 148 thus exposes MP-BGP to enable any application, including CDNI applications 146, executing on CDNI devices 12 to dynamically utilize the routing plane of network system 140 to distribute application-specific data to one another in the network without requiring offline modification, by the vendor, to the software code that implements MP-BGP for CDNI devices 12. In addition, the techniques may be applied without requiring offline modification, by the vendor, to other BGP speakers of network system 140, including route reflector 150 or, in some instances, to ASBRs. CDNI applications 146 may represent a vendor-supplied or a third-party application executing on respective software platforms of CDNI devices 12 that present respective BGP interfaces 148. In other examples of the applied techniques, application data exchanged by various applications executing on CDNI devices 12, or other BGP speakers that present BGP interfaces, may include device information such as operational data including available bandwidth for interfaces, CPU utilization, temperature, device identifiers, and failure information; network layer protocol information for network layer protocols; topology information such as Application-Layer Traffic Optimization (ALTO) network and cost maps; traffic engineering data; or any other data usable by the applications to improve the operation of network system 140 for packet/content delivery or provide information to operators of AS 142. In other words, the techniques for distributing application-defined NLRI are applicable to contexts other than content delivery network information exchange.

For a vendor, the techniques may enable the MP-BGP process and application development teams to improve innovation and time to market by reducing the resources and team coordination required to produce a stable application that uses a pre-defined extension to MP-BGP by decoupling, at least to some extent, development for the MP-BGP process and for the application. Similarly, third-party developers may use the techniques to develop custom applications independently of the network router vendor to improve and/or extend operations of a third-party network, for example, without having to enlist the vendor to perform offline application-specific modifications to the MP-BGP process, thus improving the scalability of the network system 140 routing plane for third-party developers. In addition, by utilizing an existing and well-documented routing protocol having a large base of knowledgeable users, to distribute application-specific data, the techniques may facilitate reliable, loop-free, and generalized data distribution throughout network system 140.

Figure 6:
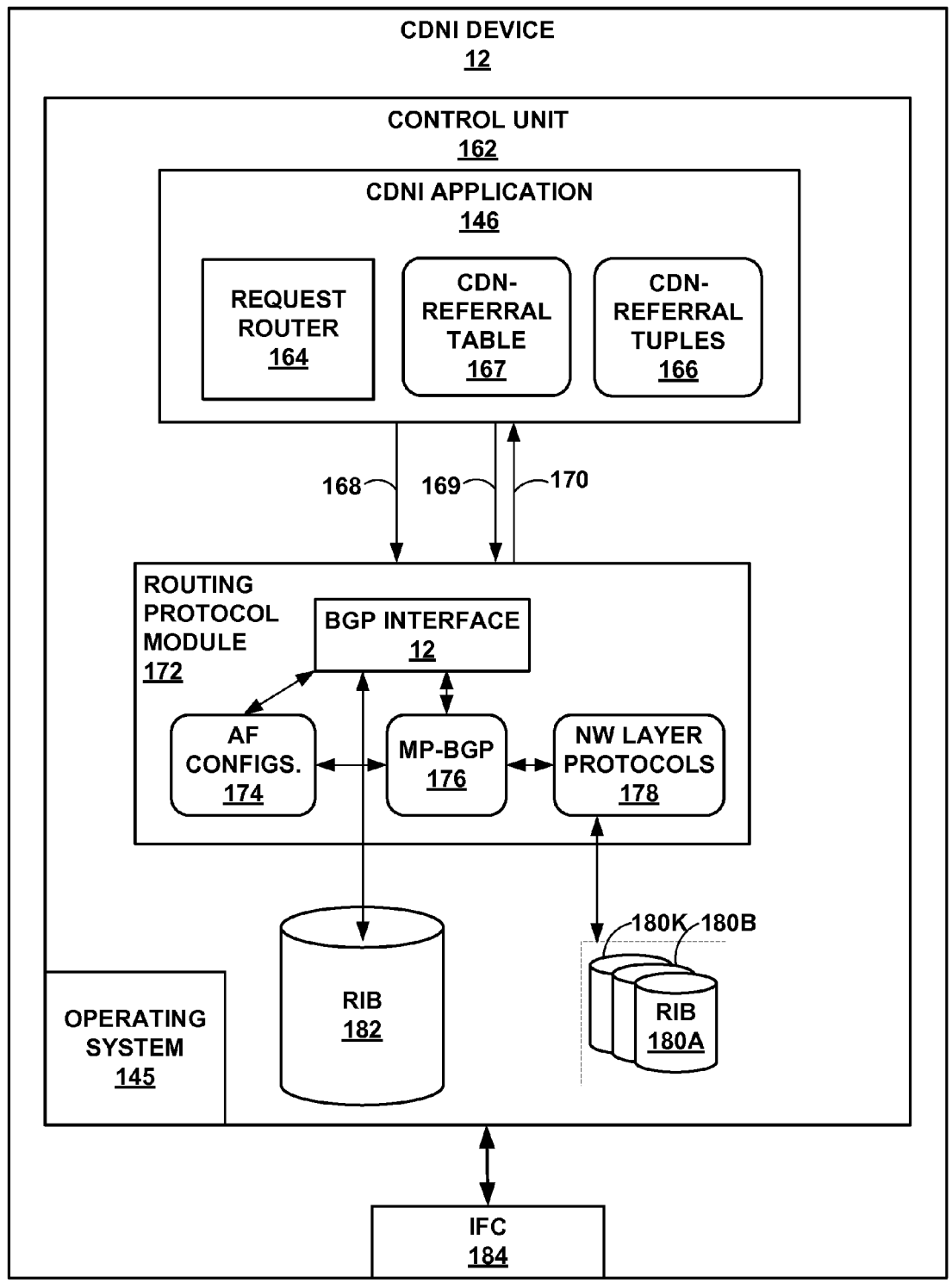
FIG. 6 is a block diagram illustrating an example device that exchanges application-defined Network Layer Reachability Information by dynamically extending Border Gateway Protocol according to techniques described herein.

FIG. 6 is a block diagram illustrating an example device that exchanges application-defined NLRIs by dynamically extending Border Gateway Protocol according to techniques described herein. CDNI device 12 may represent an example instance of any of CDNI devices 12 or any of CDN exchanges 33 of FIGS. 1, 2 and 5. In this respect, routing protocol module 172 may represent an example instance of communication module of 54 of CDN exchange 33 of FIG. 3 in further detail. CDNI device 12 includes a control unit 162 and interface card 184 coupled to control unit 162 via an internal link. Control unit 162 may comprise one or more processors (not shown in FIG. 6) that execute software instructions, such as those used to define one or more software or computer programs, stored to a computer-readable storage medium (again, not shown in FIG. 6), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 162 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Operating system 145 of control unit 162 provides a runtime environment for multiple different processes. Operating system 145 may represent, for example, a UNIX operating system derivative such as Linux or Berkeley Software Distribution (BSD). Operating system 145 offers libraries and drivers by which processes may interact with one another and with components of CDNI device 12, including a file-system and main memory. Libraries and drivers of operating system 145 may include Application Programming Interfaces (APIs) that provide standard interfaces for developers to invoke the functionality of operating system 145 and CDNI device 12 exposed by the libraries and drivers.

Processes executed by control unit 162 include vendor-supplied processes that implement routing functionality. Here, "vendor" refers to a manufacturer of CDNI device 12 and/or operating system 145. CDNI device 12 and/or operating system 145 may be distributed in conjunction with vendor-supplied processes to provide "turn-key" routing functionality with the CDNI device 12 hardware.

In the illustrated example, vendor-supplied routing protocol module 172 ("RP module 172") represents a routing protocol process that executes MP-BGP 176 by which routing information stored to one or more routing information bases 180A-180K (collectively, "RIBs 180") for respective address families may be determined. Routing information bases 180 stored to a computer-readable storage medium of control unit 162 (not shown in FIG. 6) may include information defining a topology of a network, such as network system 140 of FIG. 5. Each of RIBs 180 may be associated with a different one of network layer protocols 178 (illustrated as "NW layer protocols 178"). In such instances, because each of network layer protocols 178 is associated with a different code point (identified, e.g., by an AFI/SAFI combination), each of RIBs 178 is likewise associated with a different code point recognized by MP-BGP 176, a BGP implementation included in vendor supplied RP module 172. For example, RIB 180A may be associated with IPv4 (and the address family identifier thereof), RIB 180B may be associated with IPv6 (and the address family identifier thereof), RIB 180C may be associated with L3VPN (and the address family identifier thereof), and so on. RIBs 180 thus define a set of predefined databases each associated with a different one of a set of predefined address family identifiers for respective network layer protocols 178. In this context, "predefined" refers to a static implementation of RIBs 180 and a static association of address family identifiers with network layer protocols/respective RIBs 180 within the version of RP module 172 developed by the vendor of CDNI device 12 and/or operating system 145. In other words, RIBs 180 and the association between network layer protocols 178 respective address family identifiers, and respective RIBs 180 is "hard-coded" within the version of RP module 172 distributed by the vendor. While described herein as constituting separate data structures, RIBs 180 may be implemented by control unit 162 as any one of a number of suitable data structures, such as a single table with an AFI/SAFI field specifying the AFI/SAFI for each table row, a set of tables or databases for each of RIBs 180, linked lists, trees, tries, and so on. Because RP module 172 uses MP-BGP 176 for routing information distribution, one or more of RIBs 180 may each include a set of one or more NLRI for the corresponding address family. In some instances, CDNI device 12 does not route packets through the network for any of network layer protocols 178 and thus routing protocol module 172 may not store any of RIBs 180.

In accordance with techniques of this disclosure, RP module 172 executes BGP interface 12 by which CDNI application 146 modifies the operation of MP-BGP 56 to facilitate generalized distribution of application-specific data. BGP interface 12 may include a user-level library invocable by CDNI application 146 for directing RP module 172 to register new code points and/or receive/transmit interfaces and to exchange, with other routers using MP-BGP 176, application data using the new code points and/or receive/transmit interfaces on behalf of CDNI application 146. BGP interface 12 may use a sockets library, shared memory, files, message passing such as Common Object Request Broker Architecture (CORBA) techniques, message queuing, or other inter-process communication (IPC) mechanism for communication between CDNI application 146 and RP module 172. In some instances, aspects of BGP interface 12 may be implemented as a kernel-level library of operating system 145. A manufacturer of RP module 172 may provide an API description for BGP interface 12 to enable third-party developers or other manufacturer software development teams to develop user applications that programmatically manipulate RP module 172 and dynamically make use of BGP extensibility techniques described herein.

CDNI application 146 is a user-level process executing on the software environment provided by operating system 145 of control unit 162. CDNI application 146 may represent an application developed by a third party, such as a vendor customer or partner, an Original Equipment Manufacturer (OEM), or a research institution, that manipulates vendor-supplied components of CDNI device 12, including operating system 145, RP module 172 to facilitate third party purposes that in this case primary involve content delivery network information exchange, but may in some instances involve network operations and management, processing data into business information, running network experiments to further research goals, among others. The third party developers may use a vendor-supplied software development kit (SDK) that provides the tools, APIs, and libraries to develop user applications that use BGP interface 12. The vendor supplied SDK may, for example, provide APIs for C/C++, Perl, Python, Ruby, Scala, Java, and/or Javascript, among other programming languages. CDNI application 146 may alternatively represent an application developed by the vendor but nevertheless making use of BGP interface 12. For the vendor, this may enable the RP module 172 and CDNI application 146 development teams to decouple, at least to some extent, their respective development processes and improve innovation and time to market by reducing the resources and team coordination required to produce a stable application that exchanges application data with other routers using MP-BGP 176.

BGP interface 12 provides CDNI application 146 with a registration interface (hereinafter, "register method") for registering a new code point and/or new transmit/receive interface by specifying a corresponding AFI/SAFI and application identifier. In the illustrated example, when invoked by CDNI application 146 with a register method invocation message 168 specifying a code point and application identifier, BGP interface 12 dynamically creates routing information base (RIB) 182 to store NLRI associated with the code point. BGP interface 12 additionally configures the code point in address family configuration data 174 (illustrated as "AF Config. 174"). CDNI application 146 may use one of the IPC mechanisms described above to send register method invocation message 168.

Dynamically-created routing information base 182 stored to a computer-readable storage medium of control unit 162 (not shown in FIG. 5) may store application data associated with multiple different applications each associated with a different application identifier. RIB 182 may in some instances be predefined and associated with a "magic carpet" code point for MP-BGP that carries application-defined NLRI for multiple different applications. MP-BGP 176 may exchange opaque NLRI with the magic carpet code point but does not necessarily comprehend the application-defined NLRI. Rather, an embedded application identifier in NLRI on the magic carpet identifies to RP module 172 the application that processes the NLRI.

Application data stored to RIB 182 may, but does not necessarily, include routing information for network layer protocols such as IPv4, IPv6, and L3VPN. Application data may include any data including CDNI information that user applications including CDNI application 146 distribute or obtain by operation of RP module 172 executing MP-BGP 176 to exchange BGP UPDATE messages that include attributes carrying the application data.

Address family configuration data 174 includes a data structure to associate code points with RIBs 182 and 180. As described in further detail below, address family configuration data 174 may additionally associate each of the code points with a callback function or other reference, provided by applications that register the code point, that RP module 172 invokes upon receiving application data associated with the address family in a BGP UPDATE message.

The register method of BGP interface 12 may include an optional callback parameter by which applications may register a callback function, a reference to a shared memory location or other IPC object, or some other reference that manipulates the operation of RP module 172 upon receiving BGP UPDATE messages that specify an address family identifier and application identifier registered with the register method (as used herein, a "callback"). When an application invokes the register method including the optional callback parameter, BGP interface 12 associates the code point and application identifier provided in the register method with the value of the callback parameter in address family configuration data 54. When RP module 172 receives a BGP UPDATE message specifying a code point, RP module 172 may extract the application data (e.g., the NLRI and associated path attributes) and look up the specified code point and application identifier in address family configuration data 174. If the code point and application identifier are associated with a callback parameter value, RP module 172 provides the extracted application data to an application using the value of the callback parameter. In the illustrated example, BGP interface 12 invokes a callback function to send callback message 170 including extracted application data to CDNI application 170.

BGP interface 12 additionally includes a distribute interface (hereinafter, "distribute method") by which applications may specify a code point and application identifier registered in address family configuration data 174 and direct RP module 172 to encapsulate application data to send to other network devices in BGP UPDATE messages that specify the address family identifier. In the illustrated example, CDNI application 146 sends distribute method invocation message 169 including application data, a code point, and an application identifier to invoke the distribute method of BGP interface 12. If the address family identifier is registered, RP module 172 sends the application data in BGP UPDATE messages to BGP peer devices of CDNI device 12 that have advertised a capability to handle the code point and application-defined NLRI. In some instances, the distribute method receives application data as a struct or class.

BGP interface 12 may store application data for a code point, received from applications and from BGP peer routers in BGP UPDATE messages, to the associated one of RIBs 180 or RIP 182. RP module 172 may perform a capability advertisement exchange to determine whether a peer BGP speaker for CDNI device 12 supports a code point and application-defined NLRI according to the above-described techniques. Before distributing application data for a registered code point and application identifier to a peer BGP speaker, RP module 172 may in some cases require receipt of a BGP Capability Advertisement issued by the peer BGP speaker and having a Capabilities Optional Parameter having a value set to the code point and an additional parameter set to the application identifier. In some examples, this Capability Value field separately specifies the AFI and SAFI for the registered address family. Upon receiving assurances in the form of a suitable BGP Capability Advertisement, RP module 172 may then replicate, in whole or in part, RIB 180 for the code point to the peer BGP speaker using BGP. RP module 172 may likewise issue a BGP Capability Advertisement specifying a code point to indicate to peer BGP speakers that CDNI device 12 supports the code point. The code point may be dynamically announced without needing to terminate existing BGP sessions.

CDNI application 146 includes a request router 164, CDN-referral table 167, and CDN-referral tuples 166. CDNI application 146 may advertise CDN-referral tuples of CDN-referral tuples 166 to other CDNI devices by injecting the CDN-referral tuples into MP-BGP 176 using the above-described techniques. That is, CDNI application 146 may encapsulate the one or more CDN-referral tuples into an application-defined NLRI that include an application identifier for CDNI applications and direct RP module 172 via BGP interface 12 to advertise the NLRI in a specified code point. Similarly, CDNI application 146 may receive NLRI from MP-BGP 176 advertised to CDNI device 12, extract CDN-referral tuples included therein, and generate CDN-referral table 167 from the extracted CDN-referral tuples. Request router 164 may route content requests based on CDN-referral table 167. Various instances of CDNI device 12 of FIG. 6 may not include request router 164, CDN-referral table 167, and/or CDN-referral tuples 166.

Figure 7:
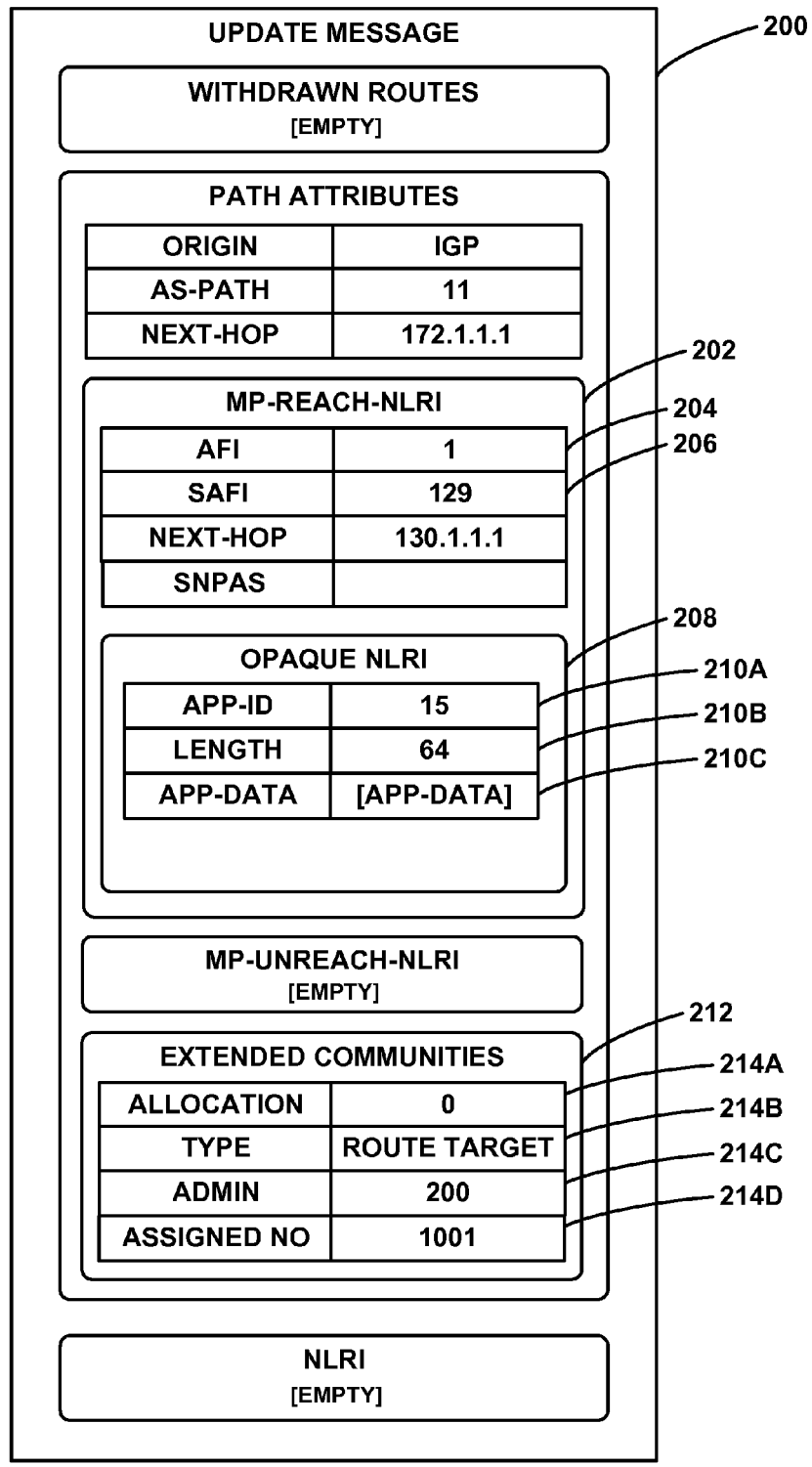
FIG. 7 is a block diagram illustrating an example advertisement that includes CDNI information in accordance with techniques described herein.

FIG. 7 is a block diagram illustrating an example advertisement that includes CDNI information in accordance with techniques described herein. Extended BGP UPDATE message 200 conforms to MP-BGP and includes MP-REACH-NLRI 202 advertising a route. Extended BGP UPDATE message 200 may represent an example instance of BGP UPDATE message 154A illustrated in FIG. 5. For purposes of illustration, extended BGP UPDATE message 200 is illustrated using glyphs, rather than with packet fields.

MP-REACH-NLRI 202 of extended BGP UPDATE message 200 specifies an Address Family Identifier (AFI) 204 of 1 in this example to indicate IPv4 network addresses, along with a value for the Subsequent AFI (SAFI) 206 of 129 to identify opaque NLRI as carrying application-defined information in a "magic carpet" code point defined by the AFI/SAFI combination 1/129. AFI 204 and SAFI 206 may in some instances have different values, as assigned by a private party or by IANA.

Opaque Network Layer Reachability Information (NLRI) 208 is illustrated and described as a Type-Length-Value (TLV) object, with the type indicated by application identifier (illustrated as "APP-ID") field 210A, a length indicated by length field 210B, and value field indicated by application data (illustrated as "APP-DATA") field 210C. Application identifier field 210A is associated in RP module 172 with CDNI application 146 executing on CDNI device 12. Application data in application data field 210C may be formatted in an application-defined format specified by CDNI application 146. The application data for CDNI application 146 may include prefix reachability and/or content availability information, such as URIs for one or more content items. While illustrated and described with respect to CDNI information, opaque NLRI 208 may carry application information for many different applications in corresponding application-defined formats.

Extended communities attribute 212 includes fields 214A-214D that define a distribution graph for BGP UPDATE 200 in combination with route target configurations on BGP speakers of a network system. CDNI application 146 may configure extended communities using BGP interface 12 to define and control opaque NLRI 208 distribution policies. The value of the route target (e.g., a combination of administrator (illustrated as "ADMIN" field 214C and assigned number (illustrated as "ASSIGNED NO") field 214D) may be associated in address family configuration data 174 with the application identifier, rather than the AFI/SAFI values. In this way, application identifiers for multiple different applications and corresponding application-defined NLRI may have distinct distribution graphs that conform to application-specific distribution requirements.

Figure 8:
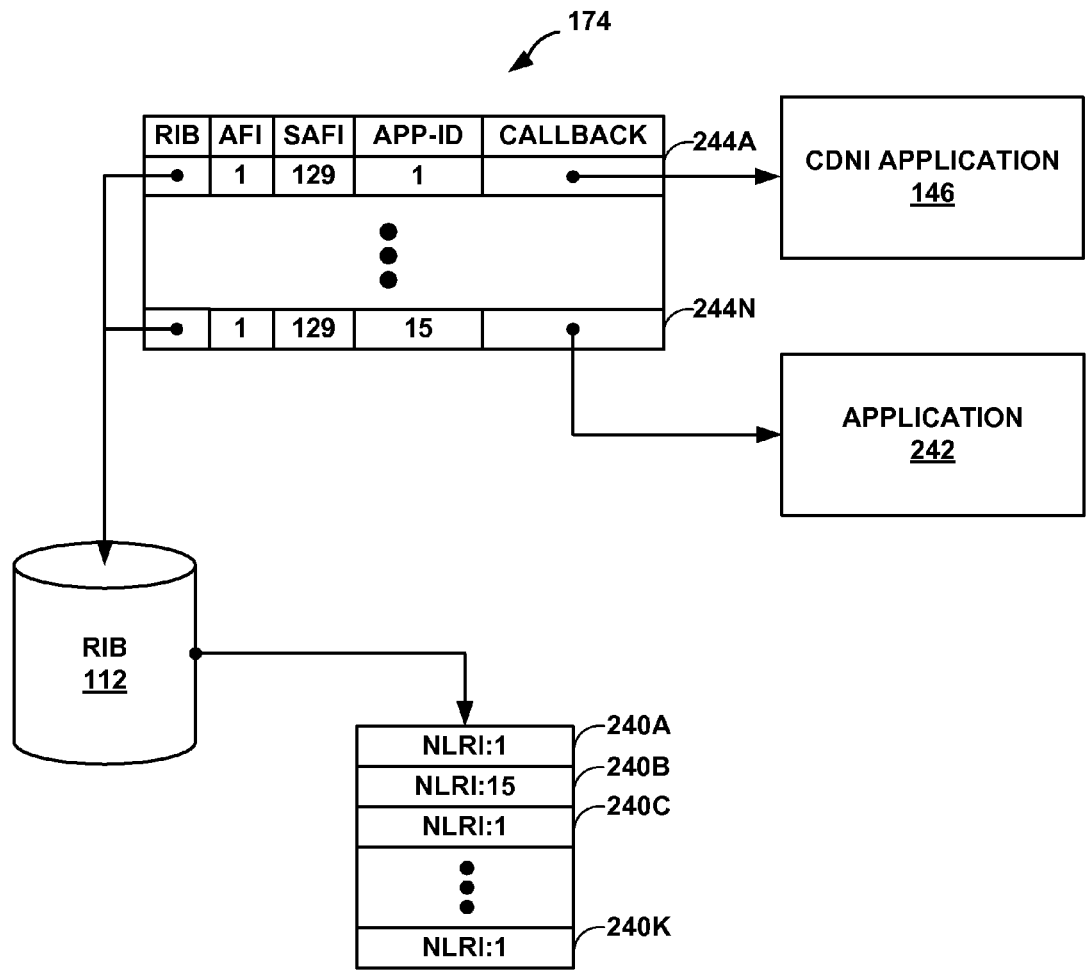
FIG. 8 is a block diagram illustrating example components for performing the techniques of this disclosure.

FIG. 8 is a block diagram illustrating example components for performing the techniques of this disclosure. The example components may be described in the context of CDNI device 12 of FIG. 6.

CDNI application 146 and application 242 execute on control unit 162 on which routing protocol module 172 also executes. Each of the applications invokes a register method exposed by BGP interface 12 and supplies an AFI, a SAFI, an application identifier, and a callback parameter value. The combination of the AFI and SAFI define, in this example, a code point for MP-BGP. The callback parameter value identifies a mechanism by which RP module 172 may provide application data to the associated application.

BGP interface 12 responsively executes the register method invoked by the applications to register the combination of the code point, application, and callback by inserting one of table entries 244A-244N (collectively, "table entries 244") into address family configuration data 174. In the illustrated example, address family configuration data 174 is a table that includes table entries 244 each having values for CALLBACK, AFI, SAFI, APP-ID, and RIB fields. For each of table entries 244, the CALLBACK field stores a callback value, the AFI and SAFI fields define a code point, the APP-ID specifies an application identifier for NLRI for the code point, and the RIB field includes a reference to RIB 112. In this example, the code point defined by the AFI/SAFI of 1/129 is a magic carpet that carries application data multiplexed into opaque NRLI carried by MP-REACH-NLRI specifying the code point and distinguishable by the application identifier. Here, table entry 244A specifies an application identifier having value 1 associated with CDNI application 146. Table entry 244N specifies an application identifier having value 15 associated with application 242.

RIB 112 stores, in this example, opaque NLRI 240A-240K containing application-defined application data for CDN application 146 and application 242. For instance, opaque NLRI 240B specifies an application identifier having value 15 and contains application data for application 242. Opaque NLRI 240C, as another instance, specifies an application identifier having value 1 and contains application data for CDNI application 146.

Figure 9:
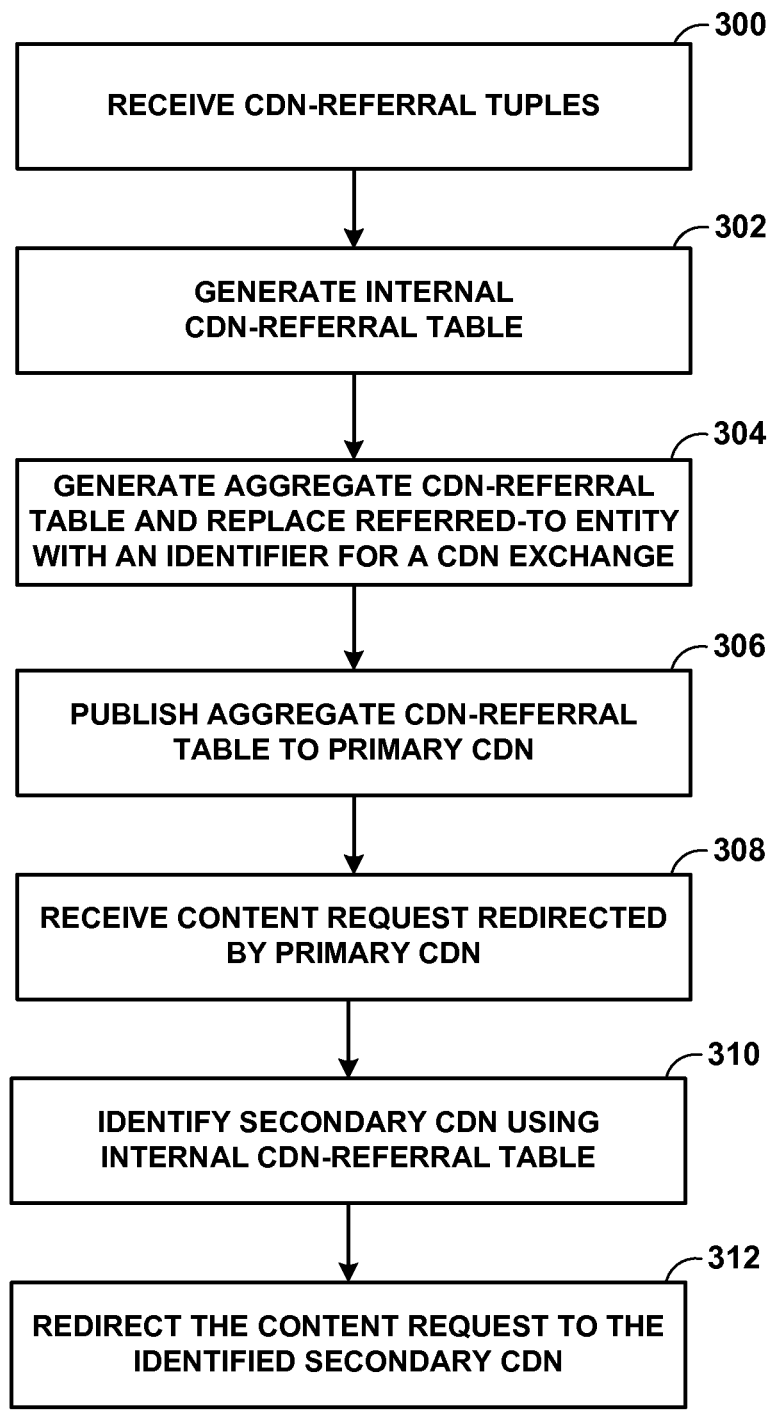
FIG. 9 is a flow chart illustrating an example mode of operation for a content delivery network exchange that accords with techniques described in this disclosure.

FIG. 9 is a flow chart illustrating an example mode of operation for a content delivery network exchange that accords with techniques described in this disclosure. The mode of operation is described with respect to devices of network system 20 of FIG. 2. CDN exchange 33 receives from respective secondary CDNs 6A, 6B messages 22A, 22B that each include one or more CDN-referral tuples specifying prefix reachability and content availability information for the secondary CDNs 6 (300). CDN exchange 33 processes the CDN-referral tuples to generate an internal CDN-referral table (302). CDN exchange 33 also processes the CDN-referral tuples to generate an aggregate CDN-referral table by aggregating prefix reachability and content availability information and replacing referred-to entities of the CDN-referral tuples with an identifier for the CDN exchange 33 (304). CDN exchange 33 publishes the aggregate CDN-referral table to primary CDN 4 in CDN-referral table upload message 34 (306).

CDN exchange 33 subsequently receives content request 36C redirected by primary CDN 4 toward CDN exchange 33 (308). CDN exchange 33 queries the internal CDN-referral table that retains the original referred-to secondary CDNs using a composite key made up of an identifier for the requested content and a network address of the requesting end user device (310). Upon matching the composite key to a CDN-referral tuple of the CDN-referral table, CDN exchange 33 redirects the content request to the referred-to one of secondary CDNs 6 in the matching tuple by sending content redirect message 34D (312).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
executing, by a network device, a routing protocol process and an application process;
invoking, by the application process, an interface of the routing protocol process to dynamically register a transmit interface of the routing protocol process for sending application data using routing protocol advertisements associated with a code point, wherein the code point identifies a routing information base for a layer 3 routing protocol;
receiving, by the routing protocol process from the application process via the transmit interface, application data for the application process; and
sending, by the routing protocol process to a peer network device, a routing protocol advertisement that conforms to the routing protocol and that includes the application data for the application process, wherein the routing protocol advertisement specifies an application identifier associated with the transmit interface that enables the peer network device to determine a corresponding receive interface of the peer network device for the transmit interface.

2. The method of claim 1,
wherein the routing protocol comprises a multiprotocol border gateway protocol (MP-BGP), and
wherein the code point of the routing protocol comprises a combination of an Address Family Identifier and a Supplemental Address Family Identifier that identifies the routing information base of a plurality of routing information bases stored by the network device.

3. The method of claim 1,
wherein the routing protocol advertisement comprises a MP-BGP UPDATE message, and
wherein the application identifier comprises an application identifier tag that is associated with the transmit interface and identifies, in the MP-BGP UPDATE message, a Network Layer Reachability Information (NLRI) defined by the application process.

4. The method of claim 1, wherein the NLRI defined by the application process comprises an opaque NLRI within a MP-REACH-NLRI of the MP-BGP UPDATE message.

5. The method of claim 1, wherein invoking the interface of the routing protocol process comprises sending, by the application process to the routing protocol process, an identifier for the code point and the application identifier.

6. The method of claim 5,
wherein the application process comprises a first application process,
wherein the application identifier comprises a first application identifier,
wherein the transmit interface comprises a first transmit interface, and
wherein the routing protocol advertisement comprises a first routing protocol advertisement, the method further comprising:
invoking, by a second application process executing on the network device, the interface of the routing protocol process to dynamically register a second transmit interface for the code point that identifies the routing information base for the routing protocol;
receiving, by the routing protocol process from the second application process via the second transmit interface, application data for the second application process; and
sending, by the routing protocol process to the peer network device, a second routing protocol advertisement that conforms to the routing protocol and that includes the application data for the second application process, wherein the second routing protocol advertisement specifies a second application identifier associated with the second transmit interface that enables the peer network device to determine a corresponding receive interface of the peer network device for the second transmit interface.

7. The method of claim 1, wherein the routing protocol advertisement comprises a first routing protocol advertisement, the method further comprising:
receiving, by the routing protocol process, a second routing protocol advertisement that conforms to the routing protocol and includes received application data; and sending, by the routing protocol process to the application process in response to determining the second routing protocol advertisement specifies the application identifier, the received application data.

8. The method of claim 1, wherein the application data comprises content delivery network (CDN) interconnection application data.

9. The method of claim 8, wherein the network device comprises a CDN exchange configured to operate as a trusted intermediary between one or more secondary CDNs and a primary CDN for the secondary CDNs.

10. A network device comprising:
a control unit comprising a hardware-based processor;
a routing protocol process configured for execution by the control unit;
an application process configured for execution by the control unit to invoke an interface of the routing protocol process to dynamically register a transmit interface of the routing protocol process for sending application data using routing protocol advertisements associated with a code point, wherein the code point identifies a routing information base for a layer 3 routing protocol,
wherein the routing protocol process is configured to receive, from the application process via the transmit interface, application data for the application process,
wherein the routing protocol process is configured to send, to a peer network device, a routing protocol advertisement that conforms to the routing protocol and that includes the application data for the application process,
wherein the routing protocol advertisement specifies an application identifier associated with the transmit interface that enables the peer network device to determine a corresponding receive interface of the peer network device for the transmit interface.

11. The network device of claim 10,
wherein the routing protocol comprises a multiprotocol border gateway protocol (MP-BGP), and
wherein the code point of the routing protocol comprises a combination of an Address Family Identifier and a Supplemental Address Family Identifier that identifies the routing information base of a plurality of routing information bases stored by the network device.

12. The network device of claim 10,
wherein the routing protocol advertisement comprises a MP-BGP UPDATE message, and
wherein the application identifier comprises an application identifier tag that is associated with the transmit interface and identifies, in the MP-BGP UPDATE message, a Network Layer Reachability Information (NLRI) defined by the application process.

13. The network device of claim 10, wherein the NLRI defined by the application process comprises an opaque NLRI within a MP-REACH-NLRI of the MP-BGP UPDATE message.

14. The network device of claim 10, wherein to invoke the interface of the routing protocol process the application process is further configured to send, by the application process to the routing protocol process, an identifier for the code point and the application identifier.

15. The network device of claim 14,
wherein the application process comprises a first application process,
wherein the application identifier comprises a first application identifier,
wherein the transmit interface comprises a first transmit interface, and wherein the routing protocol advertisement comprises a first routing protocol advertisement, the network device further comprising:
a second application process configured for execution by the control unit to invoke the interface of the routing protocol process to dynamically register a second transmit interface for the code point that identifies the routing information base for the routing protocol,
wherein the routing protocol process is further configured to receive, from the second application process via the second transmit interface, application data for the second application process; and
wherein the routing protocol process is further configured to send, to the peer network device, a second routing protocol advertisement that conforms to the routing protocol and that includes the application data for the second application process, and
wherein the second routing protocol advertisement specifies a second application identifier associated with the second transmit interface that enables the peer network device to determine a corresponding receive interface of the peer network device for the second transmit interface.

16. The network device of claim 10,
wherein the routing protocol advertisement comprises a first routing protocol advertisement,
wherein the routing protocol process is further configured to receive a second routing protocol advertisement that conforms to the routing protocol and includes received application data, and
wherein the routing protocol process is further configured to send, to the application process in response to determining the second routing protocol advertisement specifies the application identifier, the received application data.

17. The network device of claim 10, wherein the application data comprises content delivery network (CDN) interconnection application data.

18. The network device of claim 17, wherein the network device comprises a CDN exchange configured to operate as a trusted intermediary between one or more secondary CDNs and a primary CDN for the secondary CDNs.

19. A non-transitory computer-readable medium comprising instructions for causing one or more programmable processors of a network device to:
execute a routing protocol process and an application process;
invoke, by the application process, an interface of the routing protocol process to dynamically register a transmit interface of the routing protocol process for sending application data using routing protocol advertisements associated with a code point, wherein the code point identifies a routing information base for a layer 3 routing protocol;
receive, by the routing protocol process from the application process via the transmit interface, application data for the application process; and
send, by the routing protocol process to a peer network device, a routing protocol advertisement that conforms to the routing protocol and that includes the application data for the application process, wherein the routing protocol advertisement specifies an application identifier associated with the transmit interface that enables the peer network device to determine a corresponding receive interface of the peer network device for the transmit interface.

* * * * *